(12) United States Patent
Yoon et al.

(10) Patent No.: US 12,039,161 B2
(45) Date of Patent: Jul. 16, 2024

(54) ELECTRONIC DEVICE COMPRISING A PLURALITY OF TOUCH SCREEN DISPLAYS AND SCREEN DIVISION METHOD

(71) Applicant: SAMSUNG ELECTRONICS CO., LTD., Suwon-si (KR)

(72) Inventors: Yeojun Yoon, Suwon-si (KR); Soojung Lee, Suwon-si (KR); Yerin Park, Suwon-si (KR); Doeun Shin, Suwon-si (KR); Joayoung Lee, Suwon-si (KR); Yeonee Choi, Suwon-si (KR); Hoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 17/876,254

(22) Filed: Jul. 28, 2022

(65) Prior Publication Data
US 2023/0019876 A1    Jan. 19, 2023

Related U.S. Application Data

(63) Continuation of application No. PCT/KR2022/009620, filed on Jul. 4, 2022.

(30) Foreign Application Priority Data

Jul. 8, 2021    (KR) .................. 10-2021-0089972

(51) Int. Cl.
*G06F 3/04886* (2022.01)
*G06F 1/16* (2006.01)
(Continued)

(52) U.S. Cl.
CPC ........ *G06F 3/04886* (2013.01); *G06F 1/1681* (2013.01); *G06F 3/04845* (2013.01); *G06F 9/451* (2018.02); *G06F 2203/04803* (2013.01)

(58) Field of Classification Search
CPC ............... G06F 3/04886; G06F 1/1681; G06F 3/04845; G06F 9/451; G06F 2203/04803;
(Continued)

(56) References Cited

U.S. PATENT DOCUMENTS

| 8,988,381 B1 | 3/2015 | Kim et al. |
| 10,635,227 B2 | 4/2020 | Imanishi et al. |

(Continued)

FOREIGN PATENT DOCUMENTS

| CN | 107844228 A | 3/2018 |
| CN | 110941340 A | 3/2020 |

(Continued)

OTHER PUBLICATIONS

International Search Report (PCT/ISA/210) and Written Opinion (PCT/ISA/237) dated Oct. 17, 2022 issued by the International Searching Authority in International Application No. PCT/KR2022/009620.

*Primary Examiner* — Adam R. Giesy
(74) *Attorney, Agent, or Firm* — Sughrue Mion, PLLC

(57) ABSTRACT

An electronic device includes first and second touch screen displays and a processor configured to: based on receiving a first touch input on the first touch screen display and a second touch input on the second touch screen display at substantially a same time while displaying a first execution screen in a single window on the first and second touch screen displays, determine whether the first and second touch inputs are a screen split gesture when the first and second touch inputs start within a first boundary area of the first touch screen display and a second boundary area of the second touch screen display, respectively, and are released after moving a distance at substantially the same time; and display the first execution screen in a first split window on the first touch screen display and display a second execution screen in a second split window on the second touch screen display based on the screen split gesture.

14 Claims, 27 Drawing Sheets

(51) Int. Cl.
  *G06F 3/04845* (2022.01)
  *G06F 9/451* (2018.01)
(58) Field of Classification Search
  CPC ......... G06F 2203/04808; G06F 1/1641; G06F
            1/1643; G06F 1/1647; G06F 3/04883;
            G06F 3/0484; G06F 3/0481; G06F
            3/0488; G06F 3/1431
  See application file for complete search history.

(56) References Cited

U.S. PATENT DOCUMENTS

| | | | |
|---|---|---|---|
| 2013/0321340 A1* | 12/2013 | Seo ........................ | H04M 1/724 |
| | | | 345/174 |
| 2015/0338888 A1 | 11/2015 | Kim et al. | |
| 2016/0132074 A1 | 5/2016 | Kim et al. | |
| 2018/0039408 A1 | 2/2018 | Cheong et al. | |
| 2018/0342226 A1 | 11/2018 | Shin et al. | |
| 2018/0356972 A1 | 12/2018 | Wang et al. | |
| 2021/0117068 A1* | 4/2021 | Chae ................... | G06F 3/04186 |
| 2022/0291825 A1* | 9/2022 | Ahn ....................... | G06F 1/1643 |
| 2022/0303379 A1* | 9/2022 | Lee .......................... | G06F 3/14 |

FOREIGN PATENT DOCUMENTS

| | | |
|---|---|---|
| JP | 2020-57123 A1 | 4/2020 |
| KR | 1020140085039 A | 7/2014 |
| KR | 1020150096172 A | 8/2015 |
| KR | 10-2016-0055646 A | 5/2016 |
| KR | 1020180015533 A | 2/2018 |
| KR | 10-2018-0027467 A | 3/2018 |
| KR | 1020180081133 A | 7/2018 |
| KR | 10-2018-0129432 A | 12/2018 |
| KR | 1020210082910 A | 7/2021 |
| WO | 2016/039498 A1 | 3/2016 |
| WO | WO-2019199086 A1 * | 10/2019 ........... G06F 1/1643 |

\* cited by examiner

ELECTRONIC DEVICE COMPRISING A PLURALITY OF TOUCH SCREEN DISPLAYS AND SCREEN DIVISION METHOD

CROSS-REFERENCE TO RELATED APPLICATIONS

This application is a bypass continuation application of International Application No. PCT/KR2022/009620, filed on Jul. 4, 2022, which is based on and claims priority to Korean Patent Application No. 10-2021-0089972, filed on Jul. 8, 2021, in the Korean Intellectual Property Office, the disclosures of which are incorporated by reference herein in their entireties.

BACKGROUND

1. Field

Various embodiments relate to an electronic device including a plurality of touch screen displays and a screen split method.

2. Description of Related Art

Electronic devices are evolving from uniform shapes into structures for expanding a display or improving utilization of a display. An electronic device may have a transformable structure capable of adjusting a size of a display. For example, the electronic device may operate in an in-folding, out-folding, or in/out-folding manner by rotating a first housing and a second housing about each other. In another example, the electronic device may operate in a manner in which the first housing and the second housing slide/or are rolled.

In an electronic device (e.g., a foldable electronic device) in which two housings are folded or unfolded with respect to each other, a first housing and a second housing are rotated through a hinge device, and thus a display structure may be transformed to have various shapes.

The electronic device may variably operate a display area in which information is displayed according to a change in display structure. The electronic device applies a split screen function or a pop-up screen function when performing multitasking of a plurality of applications at the same time. However, to enter a screen split function in the electronic device, a user inconveniently needs to manipulate a touch a plurality of times. Further, a menu structure having a depth (e.g., upper menu and lower menu) is not intuitive to the user, and if the user does not know a configuration location for the screen split function, the user inconveniently needs to check a configuration menu for the split screen function one by one. In addition, the electronic device may cause inconvenience in recognizing information to the user due to overlapping of screen windows during the pop-up screen function.

Therefore, according to a new display structure that is transformed into various forms, a new intuitive interaction method may be required for the user to operate a split screen in relation to a currently running screen.

SUMMARY

According to an aspect of the disclosure, an electronic device may include: a hinge device; a first housing connected to the hinge device; a second housing connected to the hinge device and configured to be folded with respect to the first housing via the hinge device; a first touch screen display provided on a first side of the first housing; a second touch screen display provided on a second side of the second housing, the first touch screen display and the second touch screen display facing each other in a folded state; and at least one processor operatively connected to the first touch screen display and the second touch screen display, wherein the at least one processor is configured to: display a first execution screen displaying visual information in a single window having a first size on the first touch screen display and the second touch screen display; based on a first touch input on the first touch screen display and a second touch input on the second touch screen display being received at substantially a same time in while the first execution screen is displayed in the single window having the first size, determine whether the first touch input and the second touch input are recognized as a screen split gesture based on the first touch input starting within a first boundary area of the first touch screen display and being released after moving by a preset distance and the second touch input starting within a second boundary area of the second touch screen display and being released after moving by the preset distance at substantially the same time; and based on recognition of the screen split gesture, displaying the first execution screen in a first split window having a second size corresponding to the first touch screen display and display a second execution screen in a second split window corresponding to the second touch screen display by splitting the single window, and wherein the first boundary area and the second boundary area are adjacent to each other in an area at which the first housing and the second housing are connected to each other through the hinge device.

According to an aspect of the disclosure, a method of an electronic device including a plurality of touch screen displays may include: displaying a first execution screen displaying visual information in a single window having a first size on a first touch screen display disposed in a first housing and a second touch screen display disposed in a second housing; based on a first touch input on the first touch screen display and a second touch input on the second touch screen display being received at substantially a same time while the first execution screen is displayed in the single window having the first size, determining whether the first touch input and the second touch input are recognized as a screen split gesture based on the first touch input starting within a first boundary area of the first touch screen display and being released after moving by a preset distance and the second touch input starting within a second boundary area of the second touch screen display and being released after moving by the preset distance substantially at the same time; and based on recognition of the screen split gesture, displaying the first execution screen in a first split window having a second size corresponding to the first touch screen display and displaying a second execution screen in a second split window corresponding to the second touch screen display by splitting the single window, wherein the first boundary area and the second boundary area are adjacent to each other at one side on which the first housing and the second housing are connected to each other through a hinge device.

According to various embodiments, an electronic device including a plurality of touch screen displays may recognize a split touch gesture, based on a plurality of touch inputs received in adjacent boundary areas of the plurality of touch screen displays, thereby intuitively operating a screen split function and thus improving user convenience.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
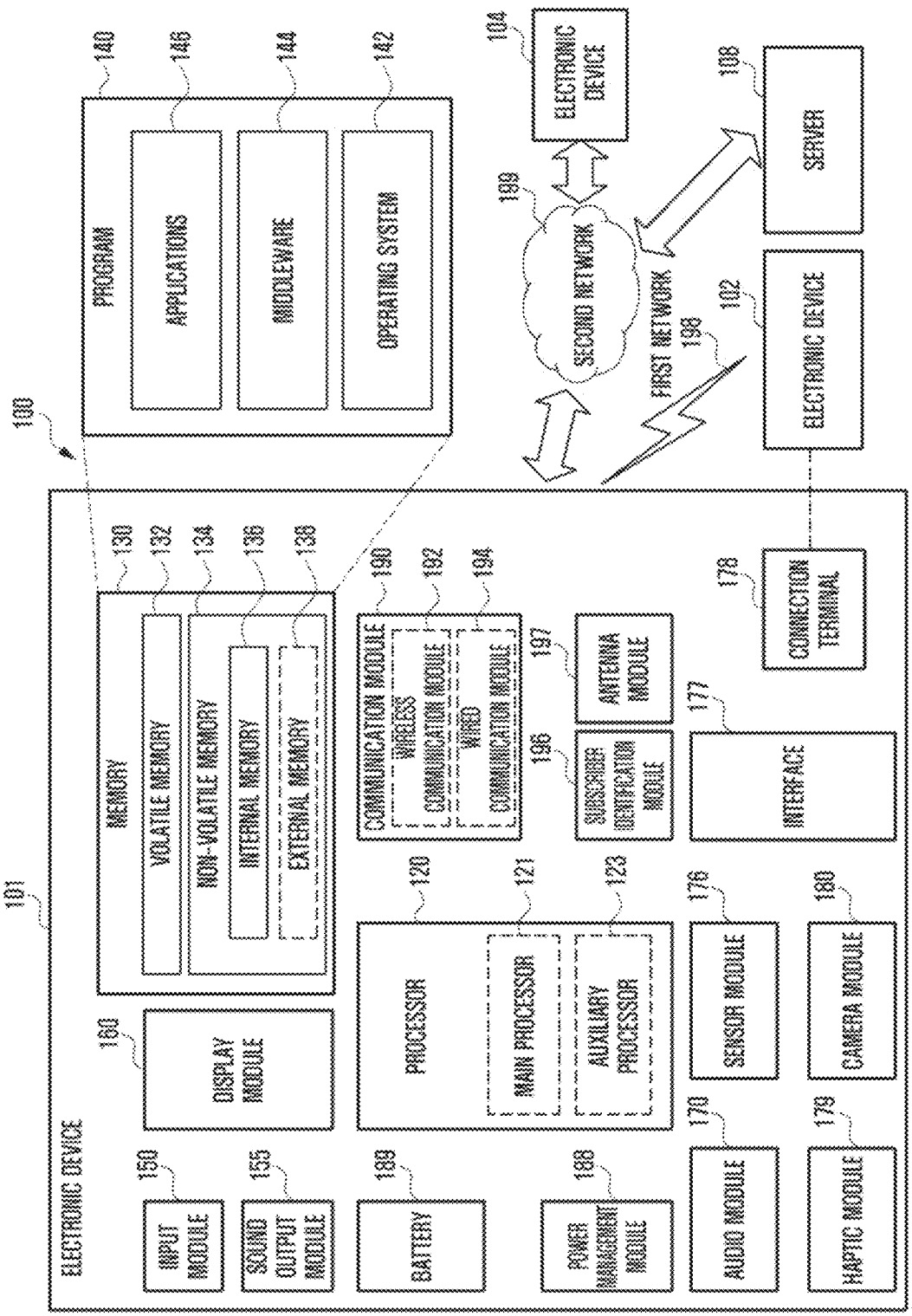
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
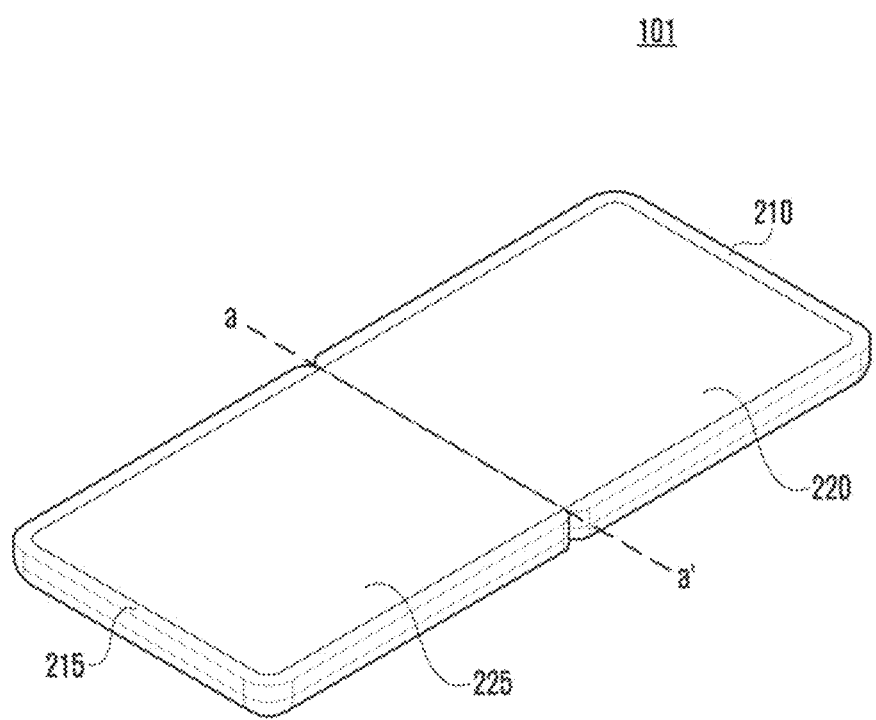
FIG. 2A to FIG. 2C illustrate an electronic device according to an embodiment.
Figure 2B:
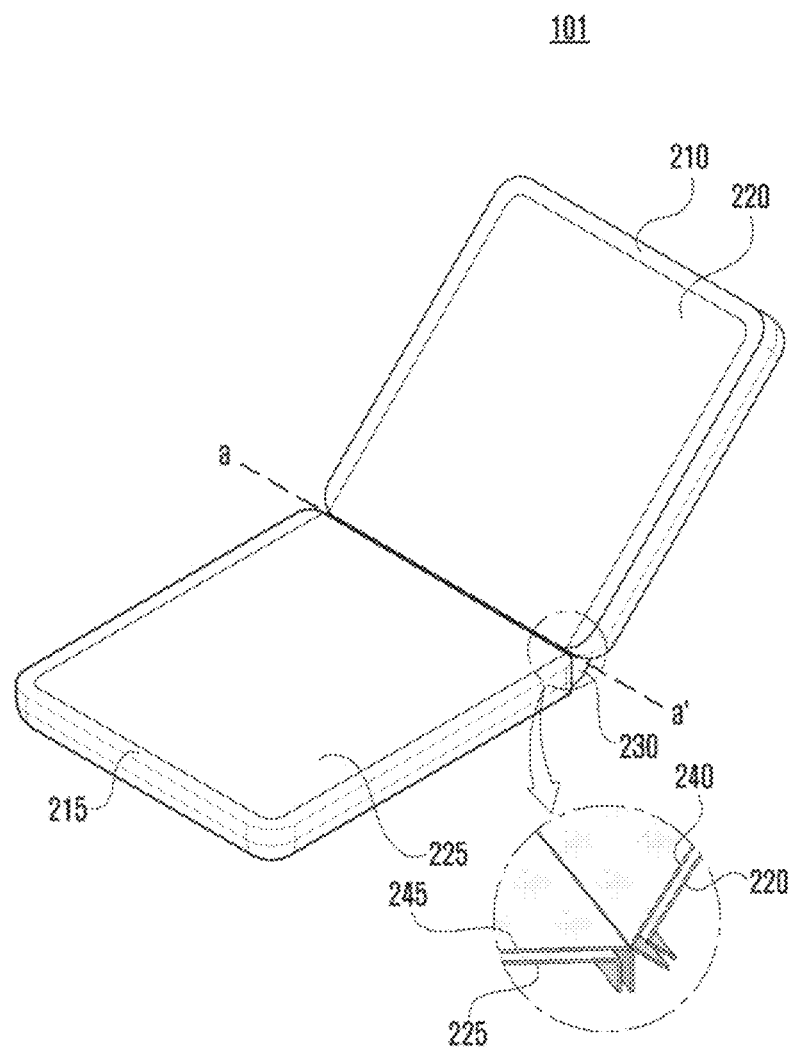
Figure 2C:
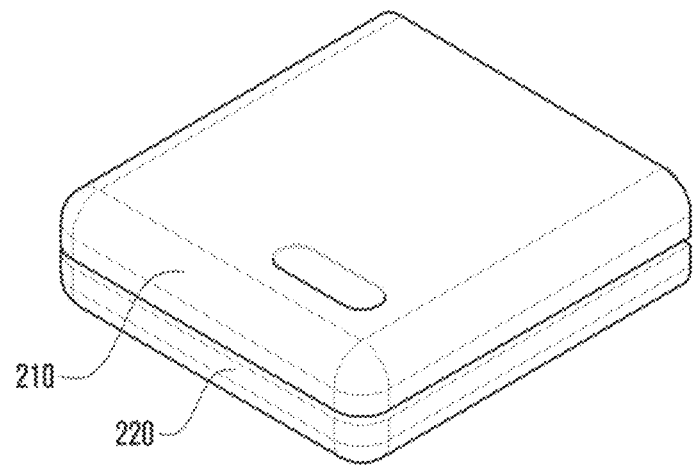

FIG. 2A to FIG. 2C illustrate an electronic device according to an embodiment. The electronic device 101 illustrated in FIG. 2A to FIG. 2C is an example provided merely for illustration, and the external appearance of the electronic device 101 is not limited to the external appearance of an electronic device described herein. For example, the electronic device 101 applied to this document includes a first touch screen display and a second touch screen display that are physically separated from each other, but a structure in which the first touch screen display and the second touch screen display are disposed to be in contact with each other without a joint or to be spaced at a certain interval (e.g., a gap of 1 mm or less) in an unfolded state (e.g., open state) may be applied.

Referring to FIG. 2A to FIG. 2C, according an embodiment, the electronic device 101 (e.g., the electronic device 101 of FIG. 1) may include a first housing 210, a second housing 215, a first touch screen display 220, and a second touch screen display 225. The first housing 210 and the second housing 215 may be connected to form the external appearance of the electronic device 101 and may provide a space in which components of the electronic device 101 are accommodated.

The first touch screen display 220 may be disposed in the first housing 210, and the second touch screen display 225 may be disposed in the second housing 215.

According to an embodiment, the first housing 210 and the second housing 215 may be connected to rotate or fold with respect to each other in at least one direction about one side (e.g., a-a'). For example, the first housing 210 and the second housing 215 may be foldably connected to each other through a hinge device 230 with respect to one side (e.g., a-a') on which the first housing 210 and the second housing 215 are connected to each other. The electronic device 101 may be in various states (e.g., a closed state or an open state) according to a state (e.g., a folded state or an unfolded state) of the first housing 210 and the second housing 215. FIG. 2A shows that the first housing 210 and the second housing 215 are in an open state, FIG. 2B shows that the first housing 210 and the second housing 215 are in an intermediate state of being at a certain angle to one side (a-a'), and FIG. 2C shows that the first housing 210 and the second housing 215 are in a closed state.

When a front surface of the electronic device 101 is viewed with the first housing 210 and the second housing 215 open, the first touch screen display 220 may be exposed through a front surface of the first housing 210, and the second touch screen display 225 may be exposed through a front surface of the second housing 215.

When the second housing 210 and the second housing 215 are closed, the front surface of the first housing 210 and the front surface of the second housing 215 may be folded to face each other, and the first touch screen display 220 disposed on the front surface of the first housing 210 and the second touch screen display 225 disposed on the front surface of the second housing 215 may be folded to face each other.

The first touch screen display 220 and the second touch screen display 225 may be disposed adjacent to each other on the side (e.g., a-a') on which the first housing 210 and the second housing 215 are connected to each other through the hinge device 230. For example, the first touch screen display 220 and the second touch screen display 225 may be in contact with each other without a joint on the side (e.g., a-a') on which the first housing 210 and the second housing 215 are connected to each other, or may be separated by a certain interval (e.g., a gap of 1 mm or less).

The first touch screen display 220 may include a first glass 240 for protecting the display. The second touch screen display 225 may include a second glass 245 for protecting the display.

According to an embodiment, the first touch screen display 220 and the first glass 240, and the second touch screen display 225 and the second glass 245 may be configured to have a certain angle (e.g., 90 degrees) or a round shape on the side (e.g., a-a'). When the first touch screen display 220 and the first glass 240, and the second touch screen display 225 and the second glass 245 have the certain angle (e.g., 90 degrees) or the round shape, the first housing 210 and the second housing 215 may be changed to the open state, the intermediate state, or the closed state with a gap minimized.

For example, in the structure of the first touch screen display 220 and the first glass 240, and the second touch screen display 225 and the second glass 245, the displays are physically separate from each other rather than being a film type, thus not causing a distortion in a folding area, and an essential area (e.g., a decorative area) required for the film type is not required, thus making it possible to display a screen with a greater size than the film type.

According to an embodiment, a first digitizer panel capable of detecting a pen may be further disposed between the first touch screen display 220 and the first glass 240, and a second digitizer panel may be further disposed between the second touch screen display 225 and the second glass 245.

The electronic device 101 may independently operate the first touch screen display 220 and the second touch screen display 225, or may operate the two touch screen displays 220 and 225 as one display.

The electronic device 101 may output one integrated screen (or window) through the first touch screen display 220 and the second touch screen display 225, or may output a first screen on the first touch screen display 220 and a second screen on the second touch screen display 225. Alternatively, the electronic device 101 may split one integrated screen and may separately output split screens on the first touch screen display 220 and the second touch screen display 215 respectively.

Figure 3:
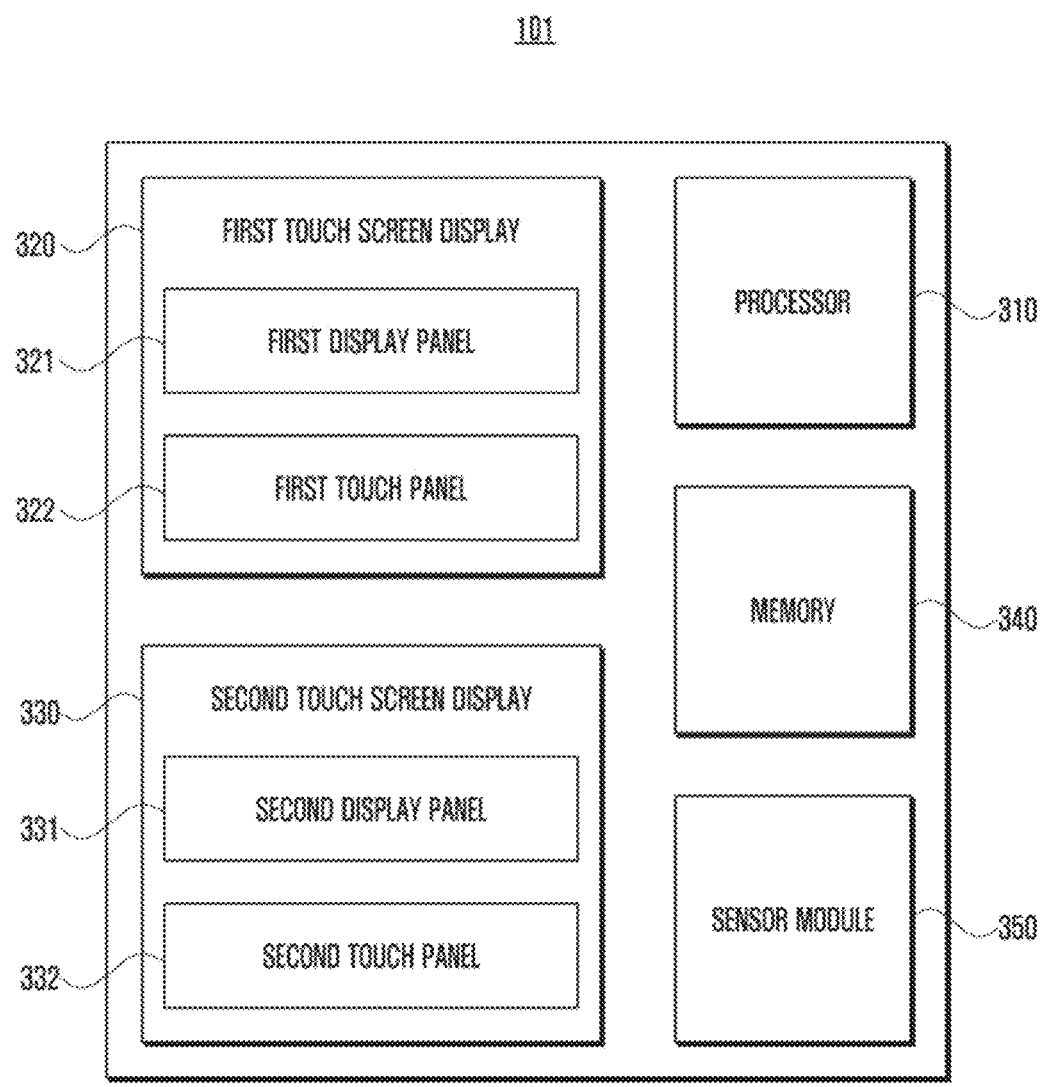
FIG. 3 is a block diagram of an electronic device according to an embodiment.

FIG. 3 is a block diagram of an electronic device according to an embodiment.

Referring to FIG. 3, the electronic device 101 according to an embodiment may include a processor 310, a first touch screen display 320 (e.g., the first touch screen display 220 of FIG. 2), a second touch screen display 330 (e.g., the second touch screen display 225 of FIG. 2), a memory 340, and a sensor module 350. According to an embodiment, the electronic device 101 may omit at least one or more of the foregoing components and may include different and/or additional components.

The first touch screen display 320 and the second touch screen display 330 may display various types of content (e.g., text, an image, a video, an icon, or a symbol). The first touch screen display 320 or the second touch screen display 330 may include, for example, a liquid crystal display (LCD), a light-emitting diode (LED) display, an organic LED (OLED) display, a microelectromechanical systems (MEMS) display, or an electronic paper display.

The first touch screen display 330 may include a first display panel 321 and a first touch panel 322, and the second touch screen display 330 may include a second display panel 331 and a second touch panel 332.

The first touch screen display 330 and the second touch screen display 330 may each include a display driver IC (DDI) configured to control the display panel. The display driver IC may receive image data from the processor 310 and may operate to display a video or an image on each display panel (e.g., the first display panel 321 and the second display panel 331). For example, when the processor 310 stores image data in a display buffer, the display driver IC may control a plurality of pixels to express colors using the image data stored in the display buffer.

The first touch screen display 330 and the second touch screen display 330 may each include a touch control circuit configured to control the touch panel. The first touch screen display 330 and the second touch screen display 330 may operate as touch screens.

The first touch panel 322 and the second touch panel 332 may detect a touch or approach of a touch object (e.g., a body part of a user or an electric pen). For example, the first touch panel 322 and the second touch panel 332 may detect the touch or approach of the touch object through a pressure method, a resistance method, an infrared method, a sonic method, an optical method, or an electromagnetic induction method.

The first touch panel 322 and the second touch panel 332 may measure a physical quantity (e.g., a variance in capacitance) changed by the touch or approach of the touch object and may transmit the measured physical quantity to the touch control circuit. The touch control circuit may analyze the received physical quantity and may determine whether a touch input has occurred. Further, the touch control circuit may analyze the received physical quantity and may obtain touch information, such as the position or area of the touch input.

The touch control circuit may transmit the obtained touch information to the processor 310. In an embodiment, the touch control circuit may transmit the received physical quantity to the processor 310 as it is or in the form of partially processed raw data. In this case, the processor 310 may analyze the received data and may obtain the touch information, such as the position or area of the touch input.

According to an embodiment, the display panel and the touch panel may be provided in the form of one integrated module.

The processor 310 may control at least one different component of the electronic device 101 and/or may execute an operation or data processing related to communication. The processor 310 may control a plurality of hardware or software components connected to the processor 310, for example, by driving an operating system or an application program, and may perform various data processing and operations.

According to an embodiment, the processor 310 may include one or more of a central processing unit (CPU), an application processor (AP), or a communication processor (CP), or may further include a graphic processing unit (GPU) and/or an image signal processor.

The processor 310 may determine whether a touch input has occurred using signal values input through the first touch panel 322 and the second touch panel 332. The processor 310 may determine touch information about a touch input, for example, a number of touch inputs, a position of a touch input, a time when a touch input has occurred, and a duration of a touch input.

The processor 310 may determine the type of a touch gesture input by the user, based on the touch information about the touch input.

The processor 310 may process at least part of content (e.g., image data, an image data stream, or the like) that changes according to a display structure change. The processor 310 may determine to output the content that changes to at least one of the first touch screen display 320 and the second touch screen display 330.

For example, the processor 310 may output an execution screen of a first application in a single window of a first size through the first touch screen display 320 and the second touch screen display 330.

In another example, the processor 310 may split or divide a single window, may switch to output the execution screen of the first application in a first split window of a second size corresponding to the first touch screen display 320, and may output another execution screen related to the first application or an execution screen of a second application in a second split window of the second size corresponding to the second touch screen display 330.

In another embodiment, the processor 310 may switch or expand an image output on the first touch screen display 320 to be displayed on the second touch screen display 330, or may switch or expand an image output on the second touch screen display 330 to the first touch screen display 320.

An electronic device 101 according to various embodiments may include: a hinge device (e.g., the hinge device 230 of FIG. 2); a first housing (e.g., the first housing 210 of FIG. 2) connected to the hinge device and including a first side, a second side opposite the first side, and a first lateral side between the first side and the second side; a second housing (e.g., the second housing 215 of FIG. 2) connected to the hinge device and including a third side, a fourth side opposite the third side, and a second lateral side between the third side and the fourth side; a first touch screen display (e.g., the first touch screen display of FIG. 2 or the first touch screen display 320 of FIG. 3) disposed on the first side of the first housing; and a second touch screen display (e.g., the second touch screen display 225 of FIG. 2 or the second touch screen display 330 of FIG. 3) disposed on the third side of the second housing, and the at least one processor (e.g., the processor 120 of FIG. 1 or the processor 310 of FIG. 3). The at least one processor may be configured to: display a first execution screen displaying visual information in a single window of a first size through the first touch screen display and the second touch screen display; receive a first touch input on the first touch screen display and receive a second touch input on the second touch screen display at substantially the same time in a state of displaying the first execution screen displayed in the single window of the first size; determine whether the first touch input and the second touch input are recognized as a screen split gesture when the first touch input starts within a first boundary area of the first touch screen display and is released after moving by a preset distance and the second touch input starts within a second boundary area of the second touch screen display and is released after moving by the preset distance substantially at the same time; and switch to display the first execution screen in a first split window of a second size corresponding to the first touch screen display and display a second execution screen in a second split window corresponding to the second touch screen display by splitting the single window in response to recognition of the screen split gesture, and the first boundary area and the second boundary area may be disposed adjacently to each other at one side on which the first housing and the second housing are connected to each other through the hinge device.

According to various embodiments, when the first touch input and the second touch input are not detected within the first boundary area and the second boundary area, the at least one processor 310 may be further configured to recognize a touch gesture according to at least one of the first touch input and the second touch input, and execute a touch function corresponding to the recognized touch gesture.

According to various embodiments, a touch start point and a touch end point are designated in part of the first boundary area and the second boundary area, and the at least one processor 310 may be further configured to recognize the first touch input and the second touch input as the screen split gesture when the first touch input and the second touch input start at the touch start point, and are released at the touch end point after moving in a first direction within the first boundary area and the second boundary area.

According to various embodiments, when the first execution screen displayed in the single window is a home screen, the first execution screen displayed in the first split window may be configured to be the home screen adjusted to the second size, and the second execution screen displayed in the second split window may be configured to be a new home screen adjusted to a size of the second touch screen display.

According to various embodiments, when the first execution screen displayed in the single window is an execution screen of the first size of a first application, the first execution screen displayed in the first split window may be configured to be the execution screen of the first application adjusted to the second size, and the second execution screen displayed in the second split window may be configured to be at least one of a home screen adjusted to a size of the second touch screen display or a different execution screen related to the first application.

According to various embodiments, when the first touch input and the second touch input move by a configured distance in a first direction within the first boundary area and the second boundary area and then at least one of the first touch input and the second touch input moves in a second direction perpendicular to the first direction, the at least one processor 310 may be further configured to display the first execution screen in a split window positioned in the second direction and display the second execution screen in a split window in a different position.

According to various embodiments, when the first touch input and the second touch input move in a third direction opposite to the first direction within the first boundary area and the second boundary area, the at least one processor 310 may be further configured to display a third execution screen different from the first execution screen in the first split window and display a fourth execution screen different from the first execution screen in the second split window, and wherein the third execution screen and the fourth execution screen may include execution screens of applications being executed in a background.

According to various embodiments, when the first execution screen is an execution screen of a first application and there is a designated function related to screen split corresponding to the first application, the at least one processor 310 may be further configured to display an execution screen related to the designated function as the second execution screen.

According to various embodiments, when the first execution screen is an execution screen of a first application and the screen split gesture is recognized in a state in which one of objects displayed on the execution screen of the first application is selected by a user input, the at least one processor 310 may be further configured to retrieve information related to the selected object and display a screen of the retrieved information as the second execution screen.

According to various embodiments, the at least one processor 310 may be further configured to display a graphic object introducing recognition of the screen split gesture in at least one of the first boundary area and the second boundary area in response to recognition of the first touch input and the second touch input as the screen split gesture.

According to various embodiments, when the first touch input received within the first boundary area and the second touch input received within the second boundary area are long touches made at substantially the same time for over a preset time, the at least one processor 310 may be further configured to display a control user interface for a screen split function in the first boundary area and the second boundary area.

According to various embodiments, when a touch gesture of selecting an object included in an execution screen of a first application and moving the object in a direction to an execution screen of a second application is received in a state of displaying the execution screen of the first application as the first execution screen in the first split window and displaying the execution screen of the second application as the second execution screen in the second split window, the at least one processor 310 may be further configured to execute a function of the second application being executed on the second execution screen, based on the object selected on the execution screen of the first application.

According to various embodiments, when a touch drag of moving in one direction in the second split window is received in a state of displaying an execution screen of a first application as the first execution screen in the first split window and displaying a different execution screen related to the first application as the second execution screen in the second split window, the at least one processor 310 may be further configured to switch to another different execution screen related to the first application in the second split window in response to the touch drag.

The memory 340 may store a command or data related to at least one different component of the electronic device 101.

The memory 340 may store instructions related to processing of a touch input. Accordingly, when the instructions are executed by the processor 310, the processor 310 may perform a function related to the processing of the touch input. Further, the memory 340 may store at least one application. The memory 340 may include an internal memory or an external memory.

The sensor module 350 may measure a physical quantity that changes according to the open/closed state of the first touch screen display 320 and the second touch screen display 330, and may transmit the measured physical quantity to the processor 310.

According to an embodiment, the sensor module 350 may include a Hall sensor. The Hall sensor may detect a magnetic field generated by a magnetic body using a property of a voltage changing according to the strength of a magnetic field. According to an embodiment, the first touch screen display 320 and the second touch screen display 330 may be disposed respectively in the first housing and the second housing forming the external appearance of the electronic device 101, and the first housing and the second housing may rotate about one side to be open and closed. In addition, the Hall sensor may be disposed inside an edge area of the first housing, and the magnetic body may be disposed inside an edge area of the second housing.

For example, since the edge area of the first housing in which the Hall sensor is disposed and the edge area of the second housing in which the magnetic body is disposed approach to each other in a direction to face each other when the first housing and the second housing are closed, the Hall sensor may detect the magnetic field generated by the magnetic body. That is, when the strength of the magnetic field detected by the Hall sensor increases, the first housing and the second housing may be considered in a state of becoming closed, and when the strength of the magnetic field detected by the Hall sensor decreases, the first housing and the second housing may be considered in a state of becoming open.

Figure 4:
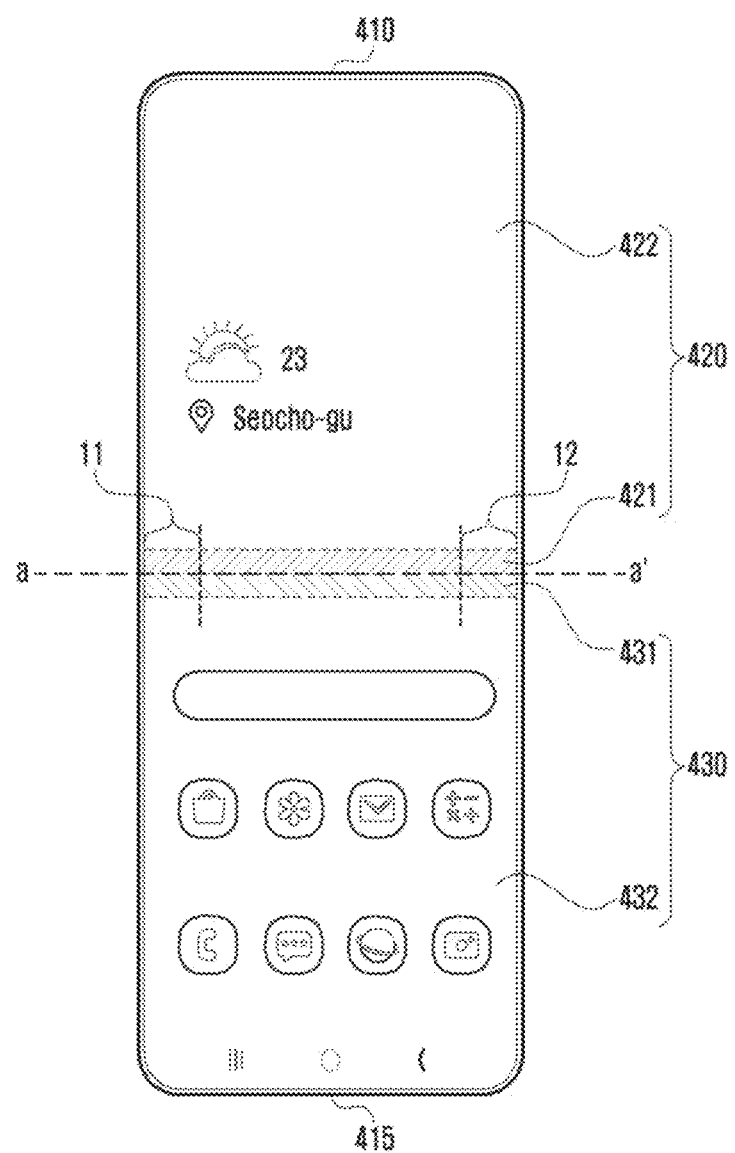
FIG. 4 illustrates a display area of a first touch screen display and a second touch screen display according to an embodiment.

FIG. 4 illustrates a display area of a first touch screen display and a second touch screen display according to an embodiment.

Referring to FIG. 4, the electronic device 101 (e.g., the electronic device 101 of FIG. 1) according to various embodiments may include a first touch screen display 420 (e.g., the first touch screen display 220 of FIG. 2A or the first touch screen display 320 of FIG. 3) and a second touch screen display 430 (e.g., the second touch screen display 225 of FIG. 2A or the second touch screen display 330 of FIG. 3) which are physically separated from each other.

In the first touch screen display 420 and the second touch screen display 430, a boundary area (e.g., a first boundary area 421 and a second boundary area 431) for a screen split gesture recognition mode and a regular area (e.g., a first regular area 422 and a second regular area 432) for a general gesture recognition mode may be designated. Here, the boundary area and the regular area may refer to virtual areas divided by software rather than a physical division.

For example, the first touch screen display 420 and the second touch screen display 430 may be disposed adjacent to each other on one side (e.g., a-a') on which a first housing 410 and a second housing 415 are connected to each other through a hinge device. In the first touch screen display 420, the first boundary area 421 may be designated adjacent to in a direction in which the second touch screen display 430 is disposed. In the second touch screen display 430, the second boundary area 431 may be disposed adjacent in a direction in which the first touch screen display 420 is disposed.

According to an embodiment, the electronic device 101 may recognize a general touch gesture, based on at least one a first touch input or a second touch input received from the first touch screen display 420 or the second touch screen display 430, and may perform functions (or actions) corresponding to the general touch gesture. Here, the general touch gesture may refer to a standard or universally designated touch gesture to operate or run the electronic device 101. For example, a touch for selecting an object may refer to a general touch gesture (e.g., a tap gesture) for executing an object, and a drag touch may refer to a general touch gesture for moving a screen.

According to an embodiment, the electronic device 101 may enter the screen split gesture recognition mode in response to the first touch input and the second touch input received in the first boundary area 421 and the second boundary area 431 satisfying one or more predetermined or configured conditions (e.g., time and/or moving direction), and may perform functions (or actions) related to a split screen (or separate display operation) by the first touch input and the second touch input.

For example, when a first touch is received in the first boundary area 421, a second touch is received in the second boundary area 431 substantially at the same time, and the first touch and the second touch are moved within the first boundary area 421 and the second boundary area 431 (or without departing from the first boundary area and the second boundary area) in a state of displaying a first execution screen in a single window of a first size through the first touch screen display 420 and the second touch screen display 430, the electronic device 101 may enter the screen split gesture recognition mode. Alternatively, the electronic device 101 may determine that a screen split gesture is recognized, based on movement of the first touch and the second touch within the first boundary area and the second boundary area.

For example, when a condition that the first touch is received in the first boundary area 421 and the second touch moves by a configured distance in one direction from the boundary areas in the second boundary area 431 is satisfied, the electronic device 101 may determine that a screen split gesture is recognized.

Upon recognizing the screen split gesture, the electronic device 101 switch the first execution screen displayed in the single window to be displayed (e.g., displayed in a downsized manner) in a first split window of a size corresponding to the first touch screen display 420 and may display a second execution screen in a second split window corresponding to the second touch screen display 430.

According to an embodiment, to enter the screen split gesture recognition mode, the electronic device 101 may further designate a first position 11 as a touch start point and a second position 12 as a touch end point within the first boundary area and the second boundary area. For example, when that the first touch and the second touch satisfy a condition of starting at the first position 11 which is a left point within the boundary areas and ending (e.g., being released) at the second position 12 which is a right point, it may be determined that the screen split gesture is recognized.

Figure 5:
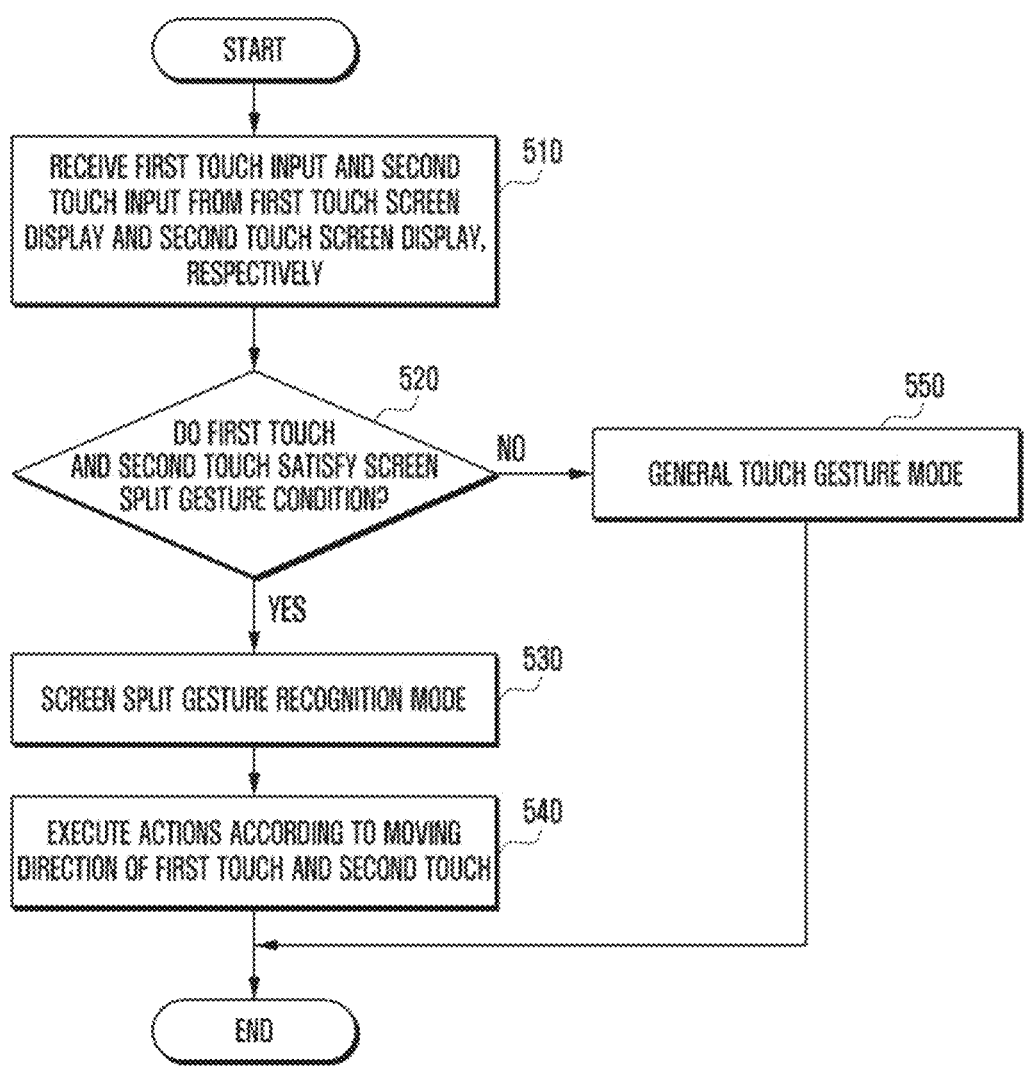
FIG. 5 illustrates a screen split method of an electronic device including a plurality of touch screen displays according to an embodiment.

FIG. 5 illustrates a screen split method of an electronic device including a plurality of touch screen displays according to an embodiment.

Referring to FIG. 5, according to an embodiment, in operation 510, a processor (e.g., the processor 120 of FIG. 1 or the processor 310 of FIG. 3) of the electronic device (e.g., the electronic device 101 of FIG. 1) may receive a first touch input from a first touch screen display and may receive a second touch input from a second touch screen display.

In operation 520, the processor 310 may determine whether the first touch input and the second touch input satisfy a screen split gesture condition.

According to an embodiment, the processor 310 may determine whether the first touch input is received in a first boundary area (e.g., the first boundary area 421 of FIG. 4) of the first touch screen display, the second touch input is received in a second boundary area (e.g., the second boundary area 431 of FIG. 4) of the second touch screen display substantially at the same time, and the first touch input and the second touch input satisfy a screen split gesture condition in a state of displaying a first execution screen in a single window of a first size through the first touch screen display 420 and the second touch screen display 430.

For example, the processor 310 may identify that the first touch is received in the first boundary area, the second touch is received in the second boundary area sequentially within a preset time (e.g., 1 sec) or substantially at the same time, and the touches are moving or have moved by a preset distance in a first direction from an initial first position to a second position. The first touch input may be a touch drag moving in the first direction within the first boundary area, and the second touch input may be a touch drag moving in the first direction within the second boundary area.

When identifying that the first touch input starting at a first position within the first boundary area has moved in the first direction and has been released at the second position and identifying that the second touch input starting at a first position within the second boundary area has moved in the first direction and has been released at a second position substantially at the same time, the processor 310 may determine that the first touch input and the second touch input satisfy the screen split gesture condition.

In operation 530, when it is determined that the first touch input and the second touch input satisfy the screen split gesture condition, the processor 310 may enter a screen split gesture recognition mode.

In operation 540, the processor 310 may execute functions (or actions) related to screen split according to movements of the first touch input and the second touch input when entering the screen split gesture recognition mode.

According to an embodiment, when the first touch input moves in the first direction within the first boundary area and the second touch input moves in the first direction within the second boundary area substantially at the same time in the state of displaying the first execution screen in the single window through the first touch screen display and the second touch screen display, the processor 310 may split the single window, may display the first execution screen through a first split window of a second size corresponding to the first touch screen display, and may display a second execution screen through a second split window corresponding to the second touch screen display. The size of the second split window corresponds to the size of the second touch screen display, and may be the second size the same as the first split window or may be a third size smaller than the second size.

The second execution screen may be a home screen or an execution screen related to an application being displayed on the first execution screen, but may provide various screens according to a configuration or design.

For example, when the first execution screen is an execution screen of a first application (hereinafter, "app"), the second execution screen may be at least one of a home screen, a different execution screen having a depth structure related to the first app, an execution screen of a second app related to the first app, or a function screen designated in response to a screen split condition in relation to the first app but is not limited thereto.

According to another embodiment, when the first touch input moves by a configured distance in the first direction within the first boundary area and the second touch input moves by a configured distance in the first direction within the second boundary area substantially at the same time in the state of displaying the first execution screen in the single window through the first touch screen display and the second touch screen display, after which the first touch input changes in a second direction perpendicularly crossing the first direction or the second touch input changes in the second direction perpendicularly crossing the first direction, the processor 310 may designate the position of a split window for displaying the first execution screen, may display the first execution screen in the split window at the designated position, and may display the second execution screen in a split window at a different position.

According to still another embodiment, when the first touch input moves in a third direction opposite to the first direction within the first boundary area and the second touch input moves in the third direction within the second boundary area substantially at the same time in the state of displaying the first execution screen in the single window through the first touch screen display and the second touch screen display, the processor 310 may display a third execution screen different from the first execution screen in a first split window corresponding to the first touch screen display and may display the first execution screen and a fourth execution screen in a second split window corresponding to the second touch screen display. The third execution screen and the fourth execution screen may be execution screens of tasks (or apps) being executed in the background while the first execution screen is displayed.

In operation 550, the processor 310 may maintain a general touch gesture mode when the first touch input and the second touch input detected in the state of displaying the first execution screen in the single window through the first touch screen display and the second touch screen display do not satisfy the screen split gesture condition.

For example, when the first touch input and the second touch input are not received substantially at the same time or the first touch input and the second touch input do not move in the boundary area (e.g., the first boundary area and the second boundary area), the processor 310 may maintain the general touch gesture mode. When the first touch input and the second touch are received at the same time but at least one of the start positions of the two touches, the release positions of the two touches, the moving distances of the two touches, and the times of the two touches does not satisfy the screen split gesture recognition conditions, the processor 310 may maintain the general touch gesture mode.

The processor 310 may identify a touch gesture mapped to at least one of the first touch input and the second touch input in the general touch gesture mode, and may execute a touch function corresponding to the touch gesture.

Figure 6A:
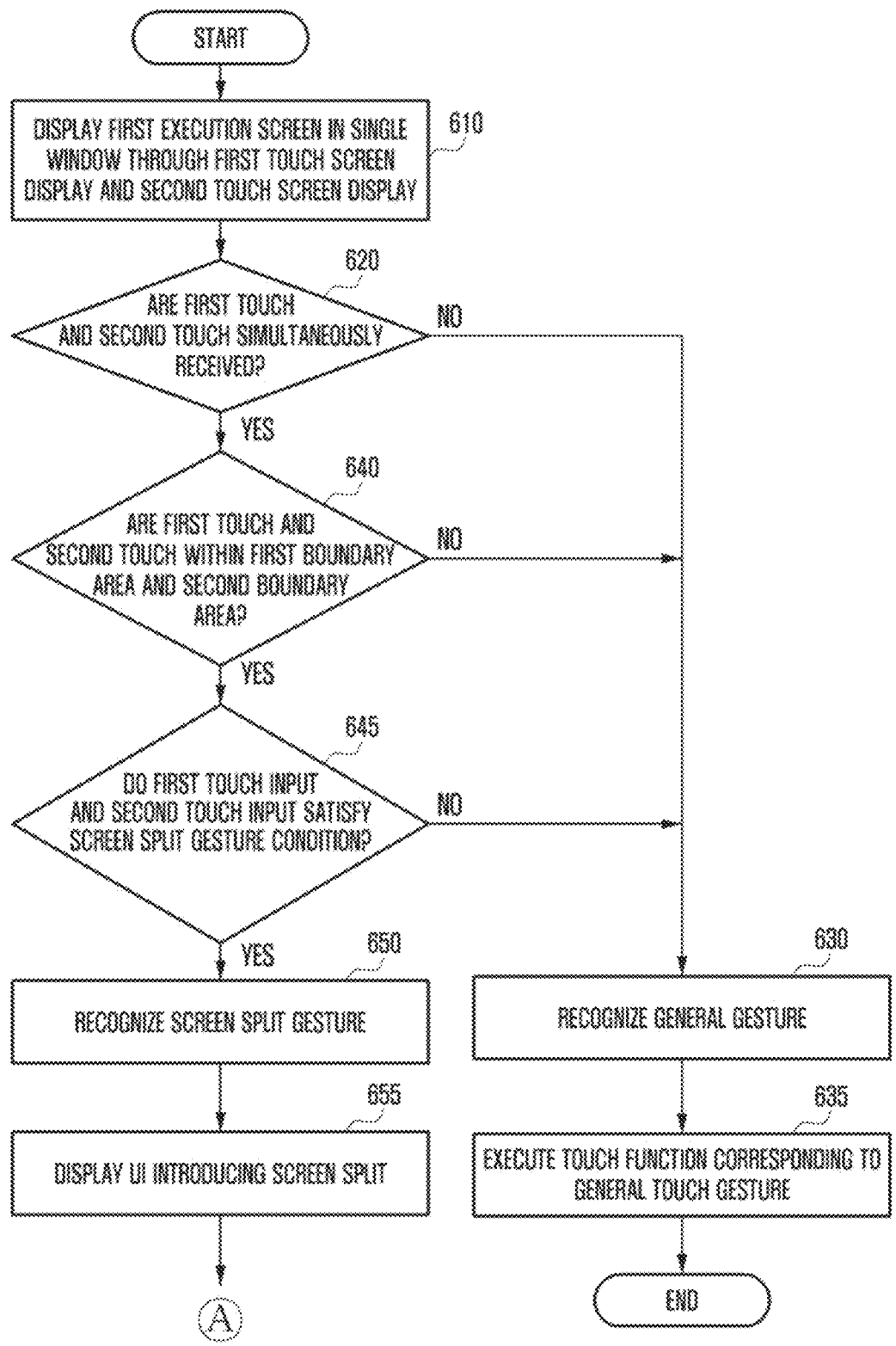
FIG. 6A and FIG. 6B illustrate a screen split method of an electronic device including a plurality of touch screen displays according to an embodiment.
Figure 6B:
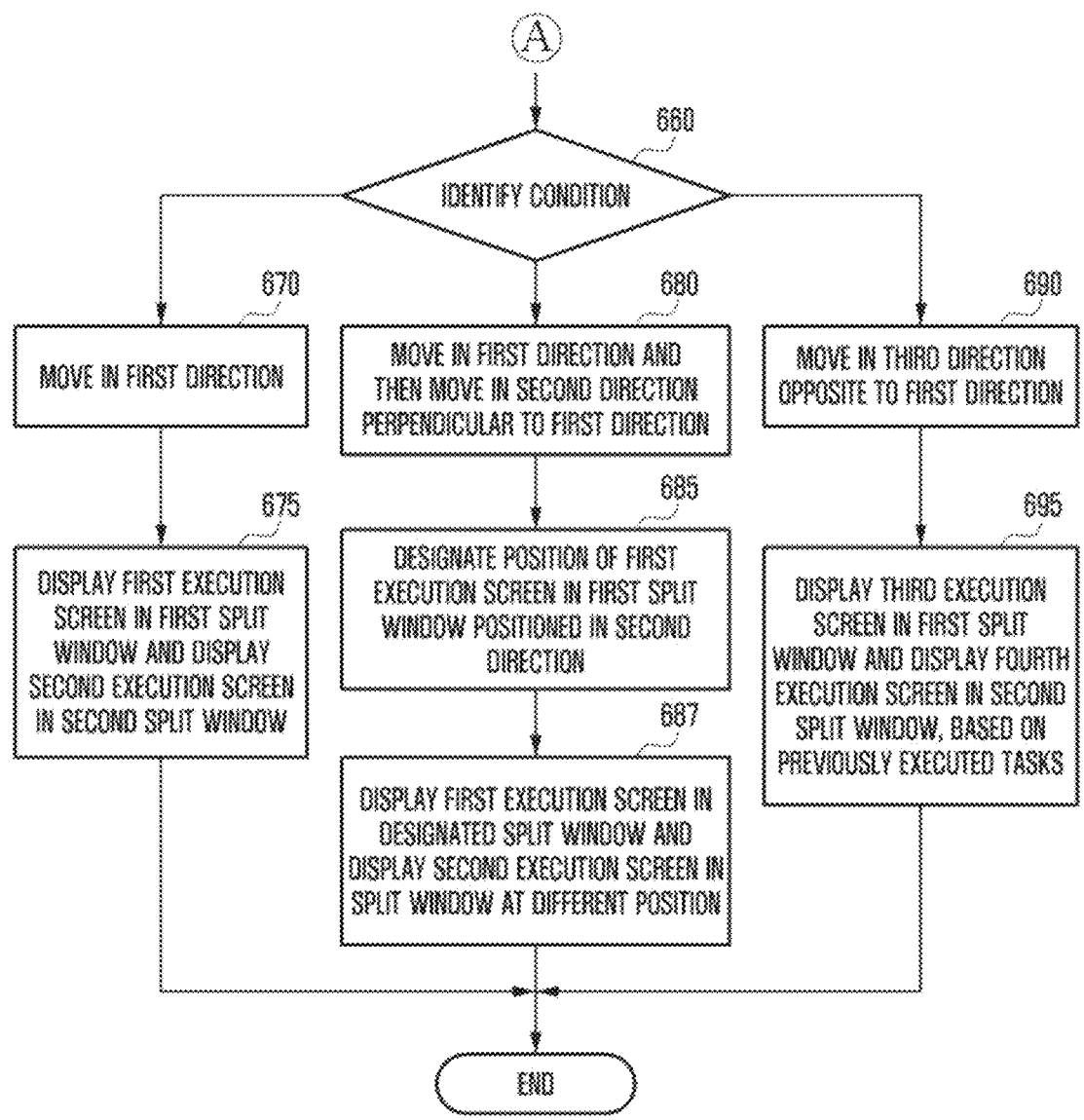

FIG. 6A and FIG. 6B illustrate a screen split method of an electronic device including a plurality of touch screen displays according to an embodiment.

Referring to FIG. 6A and FIG. 6B, according to an embodiment, in operation 610, a processor (e.g., the processor 120 of FIG. 1 or the processor 310 of FIG. 3) of the electronic device (e.g., the electronic device 101 of FIG. 1) may display a first execution screen in a single window through a first touch screen display (e.g., the first touch screen display 220 of FIG. 2A, the first touch screen display 320 of FIG. 3, or the first touch screen display 420 of FIG. 4) and a second touch screen display (e.g., the second touch screen display 225 of FIG. 2A, the second touch screen display 330 of FIG. 3, or the first touch screen display 430 of FIG. 4).

In operation 620, the processor 310 may determine whether a first touch input and a second touch input are received substantially at the same time in a first boundary area (e.g., the first boundary area 421 of FIG. 4) and a second boundary area (e.g., the second boundary area 431 of FIG. 4).

For example, when the first touch within the first boundary area of the first touch screen display and the second touch in the second boundary area of the second touch screen display are simultaneously received or when the first touch input and the second touch input are sequentially received within a configured time (e.g., 1 sec), the processor 310 may determine that the first touch input and the second touch input are received at the same time.

When the first touch input and the second touch input are not simultaneously received, the processor 310 may proceed to operation 630 and operation 635 to execute a touch function in a general gesture recognition mode.

In operation 640, the processor 310 may determine whether the first touch is within the first boundary area and whether the second touch is within the second boundary area.

When the first touch is not within the first boundary area and/or the second touch is not within the second boundary area, the processor 310 may proceed to operation 630 and operation 635 to maintain the general gesture recognition mode and to execute the touch function corresponding to a general touch gesture.

When the first touch is within the first boundary area and the second touch is within the second boundary area, the processor 310 may determine whether the first touch input and the second touch input satisfy a screen split gesture condition in operation 645.

When the times and moving distances of the first touch input and the second touch input do not satisfy a specified condition (e.g., the screen split gesture condition), the processor 310 may proceed to operation 630 and operation 635 to maintain the general gesture recognition mode and to execute the touch function corresponding to the general touch gesture.

When the first touch input and the second touch input satisfy the screen split gesture condition, the processor 310 may enter a screen split gesture recognition mode in operation 650.

When the first touch input and the second touch input satisfy the screen split gesture recognition condition, the processor 310 may provide graphic information introducing the screen split gesture recognition mode in operation 655. For example, the processor may display a screen split gesture recognition area (e.g., the boundary areas) to be visually distinguished from other regular area, or may display a screen split gesture recognition graphic user interface (GUI). In another example, the processor may display a touch gesture indicator, based on the first touch input and the second touch input received within the boundary areas.

According to an embodiment, operation 655 may be omitted.

In operation 660, the processor 310 may classify a screen split gesture by identifying movement conditions of the first touch input and the second touch input received within the first boundary area and the second boundary area.

In operation 670, the processor 310 may identify that the first touch input has started at a first position within the first boundary area and has moved by a certain distance in a first direction within the first boundary area and the second touch input has moved by a certain distance in the first direction within the second boundary area.

When the first touch input and the second touch input have moved by a configured distance in the first direction, the processor 310 may display a first execution screen in a first split window and may display a second execution screen in a second split window in operation 675.

In operation 680, the processor 310 may identify that the first touch input and the second touch input have moved by the configured distance in the first direction within the first boundary area and the second boundary area and then the first touch input and/or the second touch input has moved in a second direction perpendicularly crossing the first direction.

For example, the processor 310 may identify that the first touch input and the second touch input have moved by the configured distance in the first direction within the first boundary area and the second boundary area and then the first touch input has moved in the second direction perpendicularly crossing the first direction or the second touch input has moved in the second direction perpendicularly crossing the first direction.

When at least one of the first touch input and the second touch input has moved in the second direction, the processor 310 may assign a split window positioned in the second direction for the position of the first execution screen in operation 685.

In operation 687, the processor 310 may display the first execution screen in the split window at the assigned position and may display the second execution screen in a split window at a different position.

For example, when the first touch and the second touch have moved in the first direction within the first boundary area and then at least one of the first touch and the second touch has moved in an up direction (second direction) perpendicular to the first direction, the processor 310 may display the first execution screen in a split window positioned in the up direction (e.g., the first split window corresponding to the first touch screen display) and may display the second execution screen in a split window positioned in a down direction (e.g., the second split window corresponding to the second touch screen display).

In another example, when the first touch and the second touch have moved in the first direction within the first boundary area and then at least one of the first touch and the second have moved in the down direction (second direction) perpendicular to the first direction, the processor 310 may display the first execution screen in the split window positioned in the down direction (e.g., the second split window corresponding to the second touch screen display) and may display the second screen in the split window positioned in the up direction (e.g., the first split window corresponding to the first touch screen display).

In operation 690, the processor 310 may identify that the first touch input and the second touch input have moved within the first boundary area and the second boundary area but have moved in a third direction opposite to the first direction.

When the first touch input and the second touch input have moved in the third direction, the processor 310 may display a third execution screen different from the first execution screen in the first split window and may display a fourth execution screen in the second split window in operation 695. The third execution screen and the fourth execution screen may display tasks (or apps) being executed in the background according to an execution order (e.g., reverse chronological order).

Figure 7A:
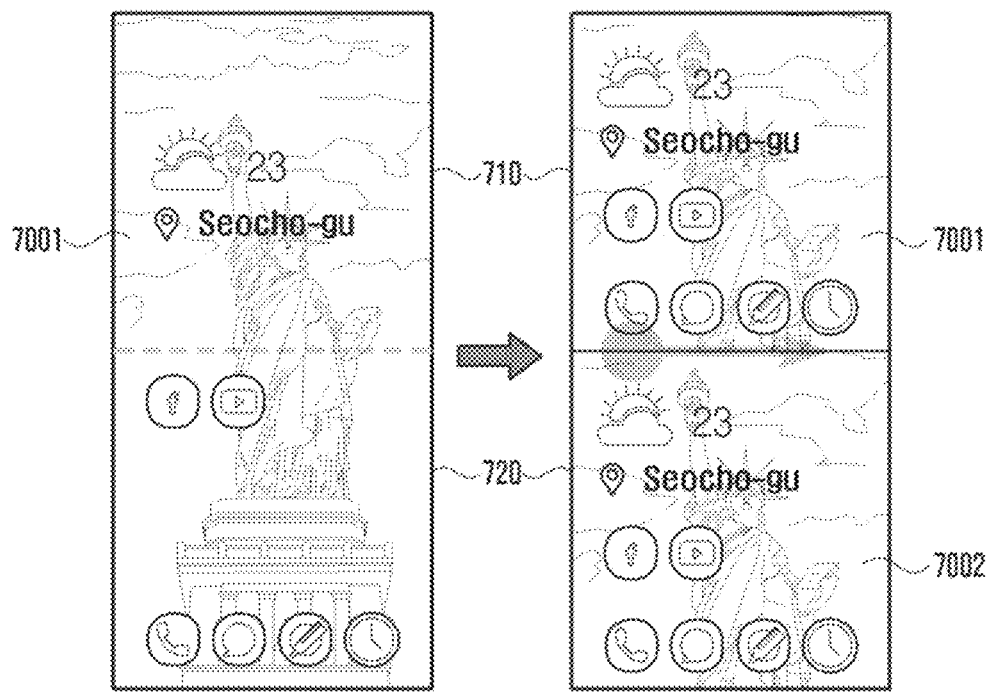
FIGS. 7A and 7B illustrate screen split situations of an electronic device including a plurality of touch screen displays according to various embodiments.
Figure 7B:
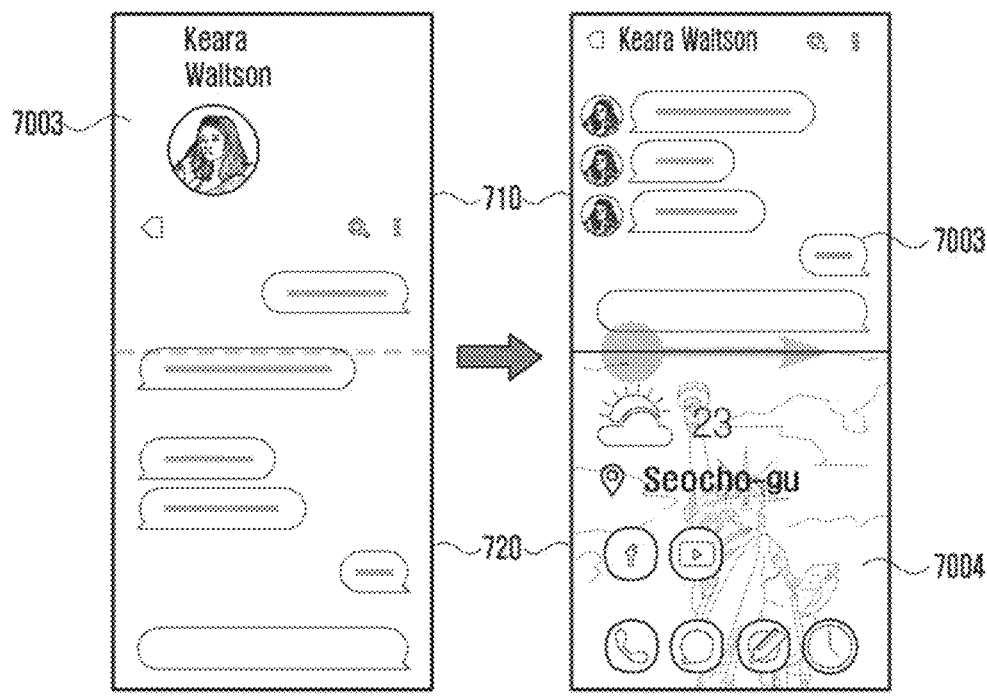

FIGS. 7A and 7B illustrate screen split situations of an electronic device including a plurality of touch screen displays according to various embodiments.

Referring to FIGS. 7A and 7B, according to various embodiments, when a first touch input received in a first boundary area (e.g., the first boundary area 421 of FIG. 4) of a first touch screen display 710 and a second touch input received in a second boundary area (e.g., the second boundary area 431 of FIG. 4) of a second touch screen display 720 satisfy a screen split gesture recognition condition in a state of displaying a first execution screen of a first size in a single window through the first touch screen display 710 and the second touch screen display 720, the electronic device (e.g., the electronic device 101 of FIG. 1) may separately operate the displays to display a screen.

According to an embodiment, as shown in FIG. 7A, the electronic device 101 may display a home screen 7001 in the single window of the first size through the first touch screen display 710 and the second touch screen display 720. The home screen 7001 may be, for example, a screen displaying execution objects of an application installed in the electronic device 101.

For example, the electronic device 101 may identify that a first touch in the first boundary area of the first touch screen display 710 and a second touch in the second boundary area of the second touch screen display 720 are received at substantially the same time, and the touches move (or are moving) in a first direction within the boundary areas in the state of displaying the home screen 7001 in the single window of the first size.

When the first touch input and the second touch input satisfy the screen split gesture condition within the first boundary area and the second boundary area, the electronic device 101 may split the single window, may switch to display the home screen (or a first home screen) 7001 in a first split window of a second size corresponding to the first touch screen display 710, and may display a second home screen 7002 in a second split window of the second size corresponding to the second touch screen display 720.

The electronic device 101 may execute an application according to a request from a user through the first home screen 7001 displayed on the first touch screen display 710 and may execute a different application according to a request by the user through the second home screen 7002 displayed on the second touch screen display 720.

According to another embodiment, as shown in FIG. 7B, the electronic device 101 may display a first application execution screen (hereinafter, "first app execution screen") 7003 in a single window of the first size on the first touch screen display 710 and the second touch screen display 720.

The electronic device 101 may operate the displays separately (i.e., split windows or multi-window) to display the first app execution screen 7003 in the first split window corresponding to the first touch screen display and to display a home screen 7004 in the second split window corresponding to the second touch screen display, based on the first touch input having been moved in the first direction within the first boundary area and the second touch input having been moved in the first direction within the second boundary area substantially at substantially the same time in the state of displaying the first app execution screen 7003 in the single window of the first size.

Figure 8:
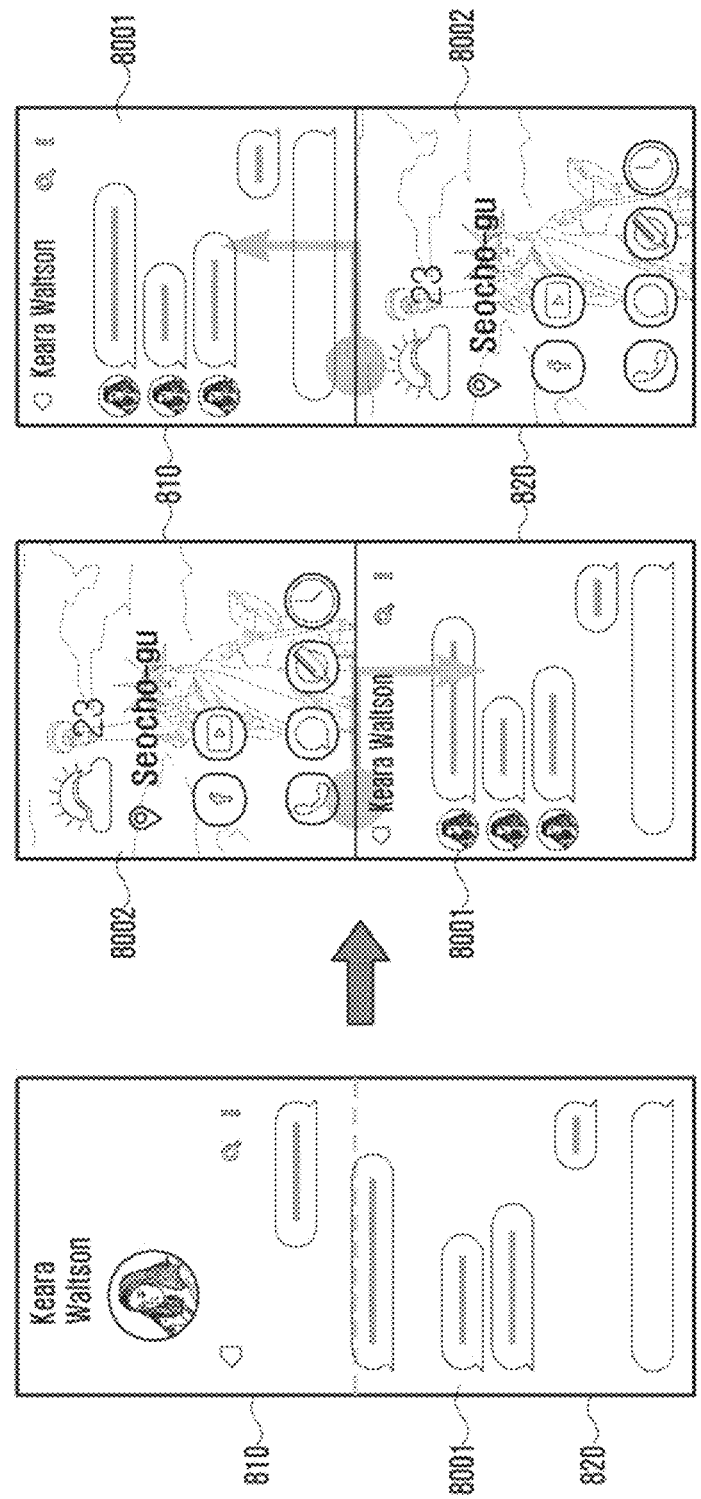
FIG. 8 illustrates a screen split situation of an electronic device including a plurality of touch screen displays according to various embodiments.

FIG. 8 illustrates a screen split situation of an electronic device including a plurality of touch screen displays according to various embodiments.

Referring to FIG. 8, according to various embodiments, in a state in which a first touch screen display (e.g., the first touch screen display 220 of FIG. 2A, the first touch screen display 320 of FIG. 3, or the first touch screen display 420 of FIG. 4) and a second touch screen display (e.g., the second touch screen display 225 of FIG. 2A, the second touch screen display 330 of FIG. 3, or the first touch screen display 420 of FIG. 4) are operated such that an execution screen is displayed in a single window, after a first touch input received in a first boundary area (e.g., the first boundary area 421 of FIG. 4) of the first touch screen display and a second touch input received in a second boundary area (e.g., the second boundary area 431 of FIG. 4) of the second touch screen display move by a preset distance in a first direction at substantially the same time within the first boundary area and the second boundary area, the electronic device (e.g., the electronic device 101 of FIG. 1) may designate the positions of split windows divided based on the moving direction.

According to an embodiment, as shown in FIG. 8, the electronic device 101 may identify that a first touch in the first boundary area of the first touch screen display 810 and a second touch in the second boundary area of the second touch screen display 820 are received at substantially the same time, the touches move in the first direction, and then the first touch input continuously moves in a down direction (e.g., a second direction) perpendicularly crossing the first direction and is released in a state of displaying a first app execution screen in a single window of a first size.

The electronic device 101 may separately operate the displays to display the first app execution screen 8001 in a second split window of a second size corresponding to the second touch screen display 820, positioned in the down direction, and to execute a home screen 8002 in a first split window corresponding to the first touch screen display 810, positioned in an up direction, based on the first touch input and the second touch input moving in the first direction substantially at the same time and then the first touch input being released in the down direction.

According to another embodiment, as shown in FIG. 8, the electronic device 101 may display the first app execution screen 8001 in the single window of the first size through the first touch screen display 810 and the second touch screen display 820.

The electronic device 101 may identify that a first touch in the first boundary area of the first touch screen display 810 and a second touch in the second boundary area of the second touch screen display 820 are received at substantially the same time, the touches move in the first direction, and then the first touch input continuously moves in the up direction (e.g., the second direction) perpendicularly crossing the first direction and is released in a state of displaying the first app execution screen 8001 in the single window of the first size.

The electronic device 101 may separately operate the displays to display the first app execution screen 8001 in the first split window corresponding to the first touch screen display 810, positioned in the up direction, and to display the home screen 8002 in the second split window corresponding to the second touch screen display 820, positioned in the down direction, based on the first touch input and the second touch input moving in the first direction substantially at the same time and then the first touch input being released in the up direction. In addition, the electronic device 101 may receive an input to select and touch any one application execution object (e.g., an app icon) displayed on the home screen 8002 in the first split window corresponding to the first touch screen display 810. The electronic device 101 may execute a selected application, may switch the home screen 8002 displayed on the first split window to an execution screen of the selected application, and may display the execution screen.

Figure 9:
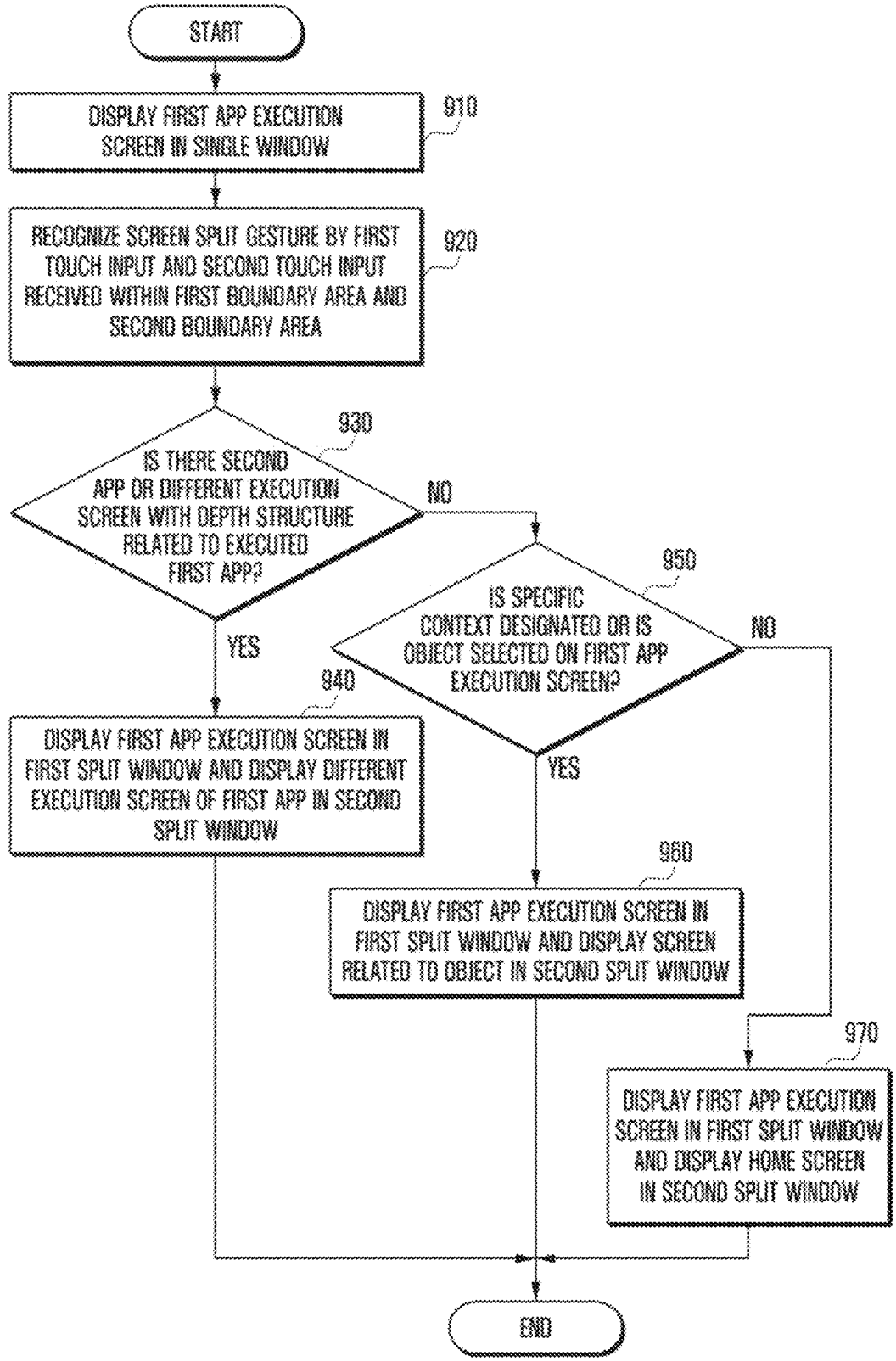
FIG. 9 illustrates a screen split method of an electronic device including a plurality of touch screen displays according to an embodiment.

FIG. 9 illustrates a screen split method of an electronic device including a plurality of touch screen displays according to an embodiment.

Referring to FIG. 9, according to various embodiments, in operation 910, a processor (e.g., the processor 120 of FIG. 1 or the processor 310 of FIG. 3) of the electronic device (e.g., the electronic device 101 of FIG. 1) may display a first app execution screen in a single window of a first size through a first touch screen display and a second touch screen display. The first app execution screen may be an execution screen of a first application (hereinafter, "first app").

In operation 920, the processor 310 may determine that a screen split gesture is recognized, based on a first touch input received in a first boundary area (e.g., the first boundary area 421 of FIG. 4) of the first touch screen display and a second touch input received in a second boundary area (e.g., the second boundary area 431 of FIG. 4) of the second touch screen display in a state of displaying the first app execution screen.

In operation 930, the processor 310 may identify whether there is a different execution screen having a depth structure related to the first app in connection with screen split, based on the screen split gesture.

According to an embodiment, for each application, a different execution screen (or sub-screen) having a depth structure or a second app related to a screen split function (or a pop-up screen function) may be designated or configured. For example, in a video application, a memo record screen may be designated as a sub-screen for the screen split function. A camera application may be designated to provide screens with different ratios as sub-screens for the screen split function.

The second app or sub-screen designated for the screen split function for each application may be designated or configured, and may be configured by a user in some cases.

When there is a sub-app or sub-screen having a depth structure related to the first app, the processor 310 may display the first app execution screen in a first split window in response to recognition of the screen split gesture, and may display the different execution screen of the first app in a second split window in operation 940.

When there is neither a second app nor a sub-screen having a depth structure related to the first app, the processor 310 may identify whether an object is selected on the first app execution screen in operation 950.

When an object is selected on the first app execution screen, the processor 310 may display the first app execution screen in the first split window and a screen related to the selected object in the second split window in operation 960.

When there is not a different execution screen having a depth structure related to the first app and no object is selected on the first app execution screen in a screen split gesture mode, the processor 310 may display the first app execution screen in the first split window and may display a home screen in the second split window in operation 970.

FIG. 10A to FIG. 10F illustrate a screen split situation of an electronic device including a plurality of touch screen displays according to various embodiments.

In examples of FIG. 10A to FIG. 10F, in a state of displaying an execution screen of a first application (hereinafter, "first app execution screen") in a single window of a first size through a first touch screen display 1010 (e.g., the first touch screen display 220 of FIG. 2A, the first touch screen display 320 of FIG. 3, or the first touch screen display 420 of FIG. 4) and a second touch screen display 1020 (e.g., the second touch screen display 225 of FIG. 2A, the second touch screen display 330 of FIG. 3, or the first touch screen display 420 of FIG. 4), the execution screen of the first application may be displayed in a first split window of a second size corresponding to the first touch screen display 1010 in response to a screen split gesture, and a different execution screen having a depth structure related to the first application or an execution screen of a second app may be provided in a second split window of the second size corresponding to the second touch screen display 1020. For example, the different execution screen having the depth structure or the second app may be mapped (or designated) in connection with a split screen (or pop-up screen) function for each application but is not limited thereto. In some cases, the type of a split type may be configured by a user.

Hereinafter, various embodiments will be described for illustration, which are only examples for description and are not limited to screens described herein.

Figure 10A:
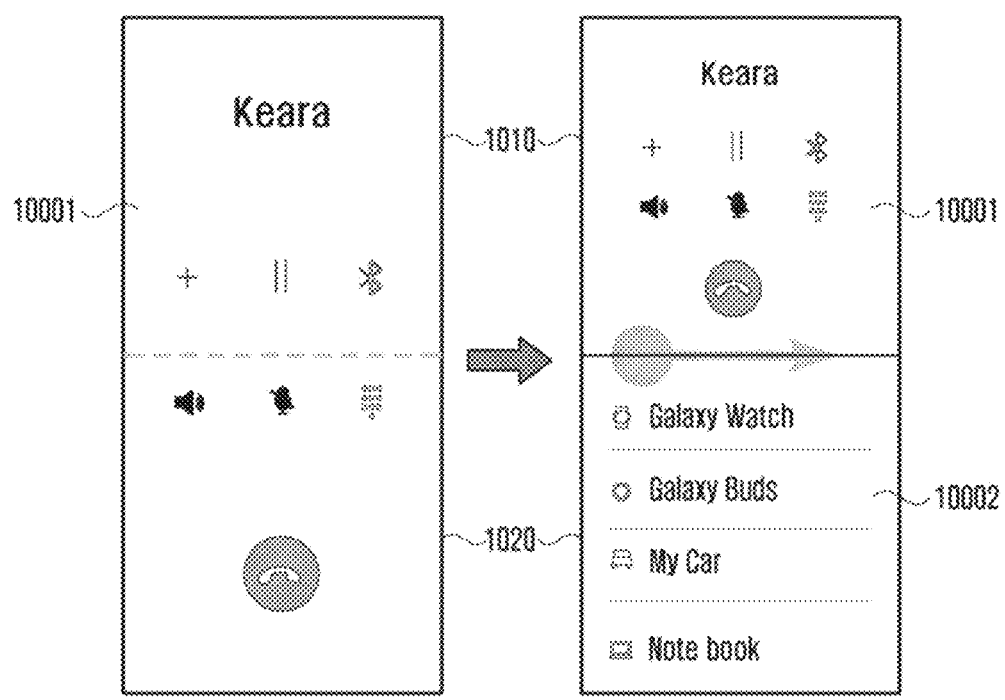
FIG. 10A to FIG. 10F illustrate a screen split situation of an electronic device including a plurality of touch screen displays according to various embodiments.

Referring to FIG. 10A, the electronic device 101 according to an embodiment may display a call screen 10001 in a single window through the first touch screen display and the second touch screen display.

The electronic device 101 may identify that a first touch is received in a first boundary area of the first touch screen display 1010, a second touch is received in a second boundary area of the second touch screen display 1020 substantially at the same time, and the touches move in a first direction within the boundary areas in a state of displaying the call screen 10001.

The electronic device 101 may display the call screen 10001 in the first split window corresponding to the first touch screen display 1010 and may display a different execution screen 10002 (e.g., a call connection configuration screen, a call list, or an information screen related to a counterpart) having a depth structure related to the call screen 10001 in the second split corresponding to the second touch screen display 1020 in response to the first touch input and the second touch input received in the first boundary area and the second boundary area satisfying a screen split gesture recognition condition.

Figure 10B:
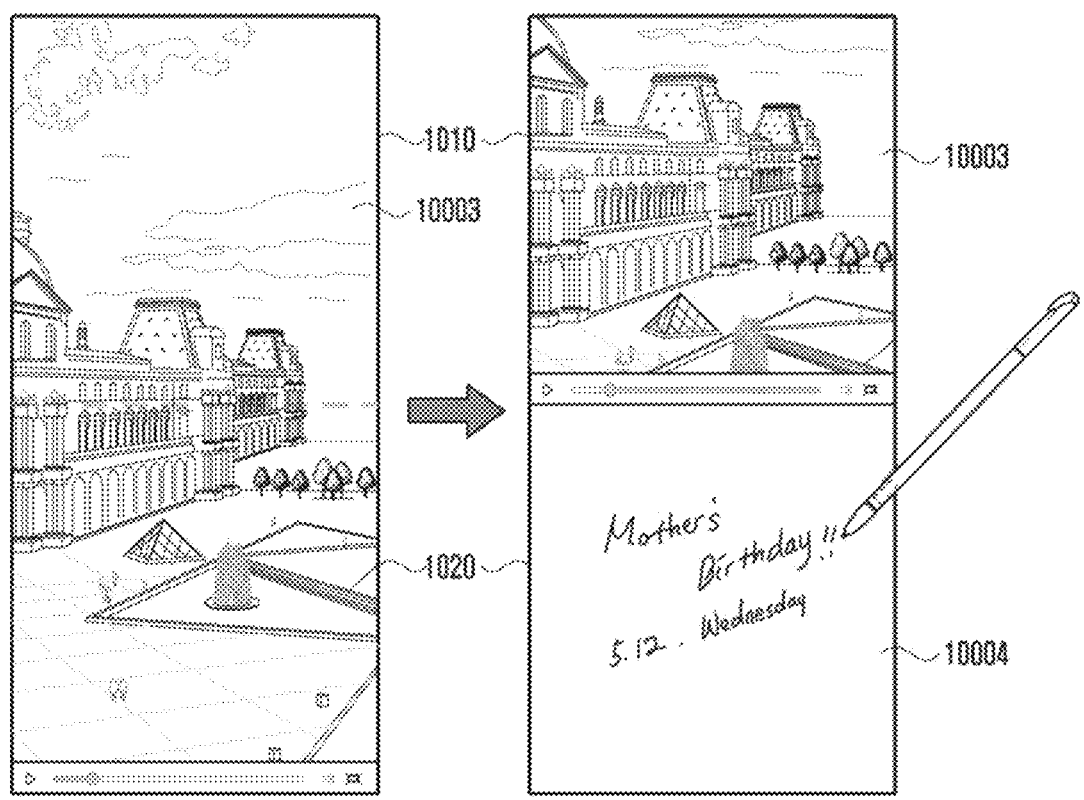

Referring to FIG. 10B, the electronic device 101 according to an embodiment may display a video lecture app execution screen 10003 in a single window through the first touch screen display 1010 and the second touch screen display 1020.

The electronic device 101 may display the video lecture app execution screen 10003 in the first split window corresponding to the first touch screen display 1010 and may display an execution screen 10004 of a memo or note app designated as a second app related to a video lecture app in the second split window corresponding to the second touch screen display 1020 in response to the first touch input and the second touch input received in the first boundary area and the second boundary area satisfying a screen split gesture recognition condition.

Figure 10C:
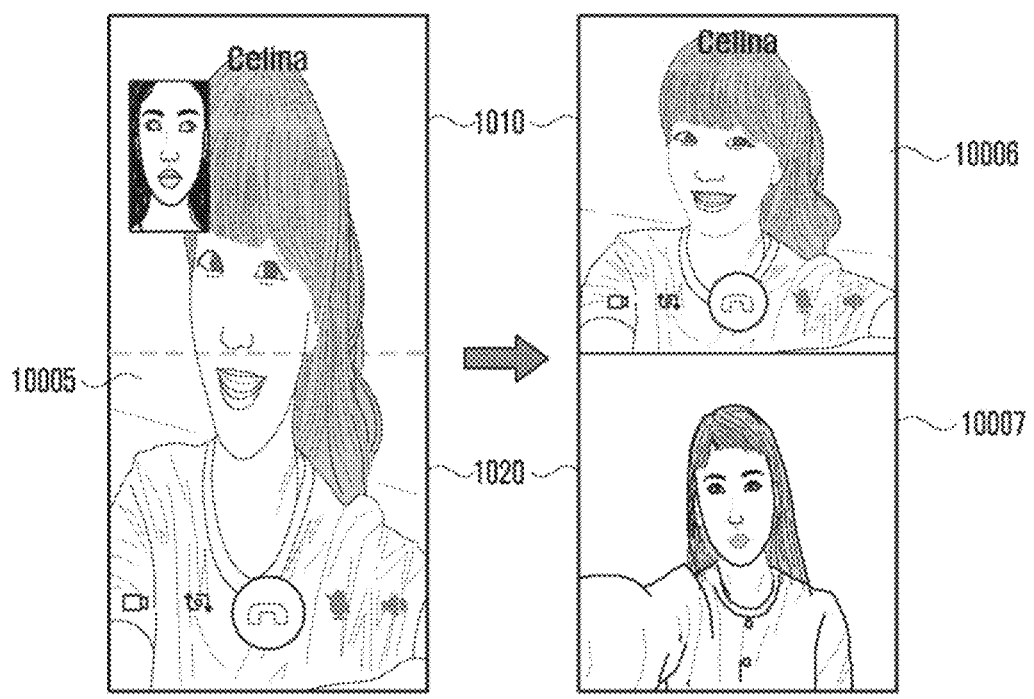

Referring to FIG. 10C, the electronic device 101 according to an embodiment may recognize a screen split gesture by a first touch input received in the first boundary area of the first touch screen display 1010 and a second touch input received in the second boundary area of the second touch screen display 1020 substantially at the same time in a state of displaying a video call screen 10005 including a user image and a counterpart image in a single window through the first touch screen display 1010 and the second touch screen display 1020. The electronic device 101 may display a user image screen 10006 in the first split window corresponding to the first touch screen display 1010 and may display a counterpart image screen 1007 in the second split window corresponding to the second touch screen display 1020 in response to the screen split gesture.

Figure 10D:
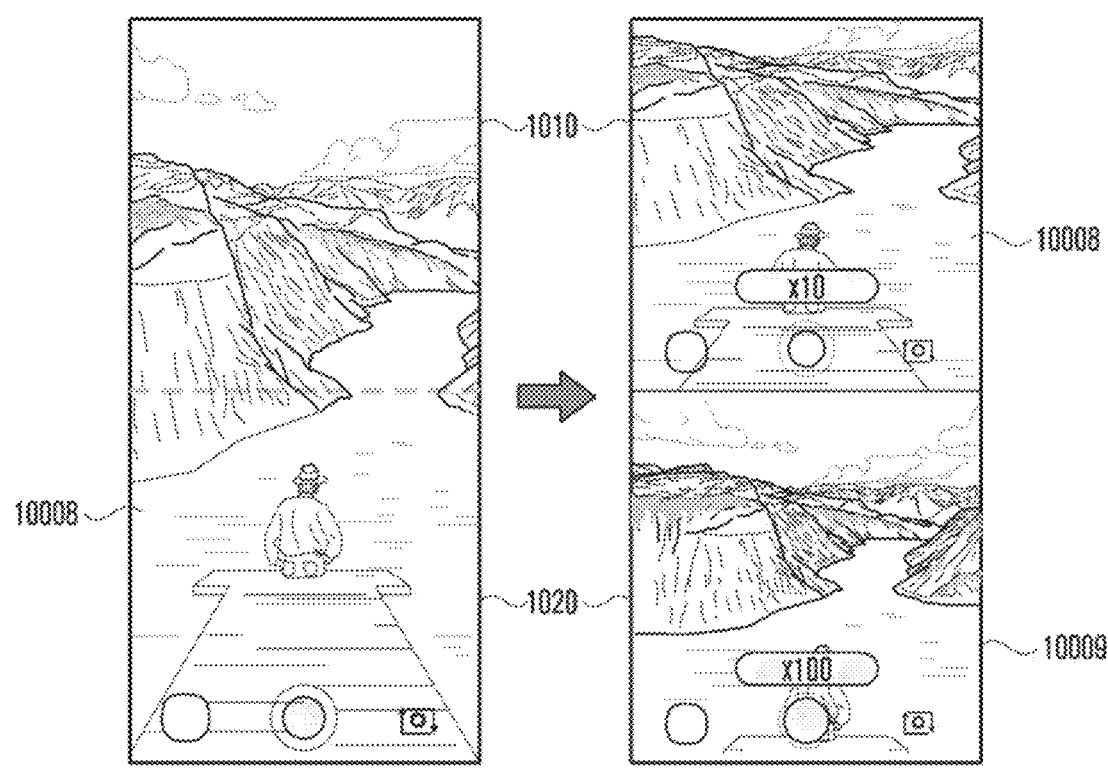

Referring to FIG. 10D, the electronic device 101 according to an embodiment may recognize a screen split gesture by a first touch input received in the first boundary area of the first touch screen display 1010 and a second touch input received in the second boundary area of the second touch screen display 1020 at substantially the same time in a state of displaying a camera execution screen 10008 in a single window through the first touch screen display 1010 and the second touch screen display 1020. The electronic device 101 may display the camera execution screen 10008 having a first zoom ratio designated by default in the first split window corresponding to the first touch screen display 1010 and may display a camera execution screen 10009 having a second zoom ratio different from the first zoom ratio in the second split window corresponding to the second touch screen display 1020 in response to the screen split gesture.

Figure 10E:
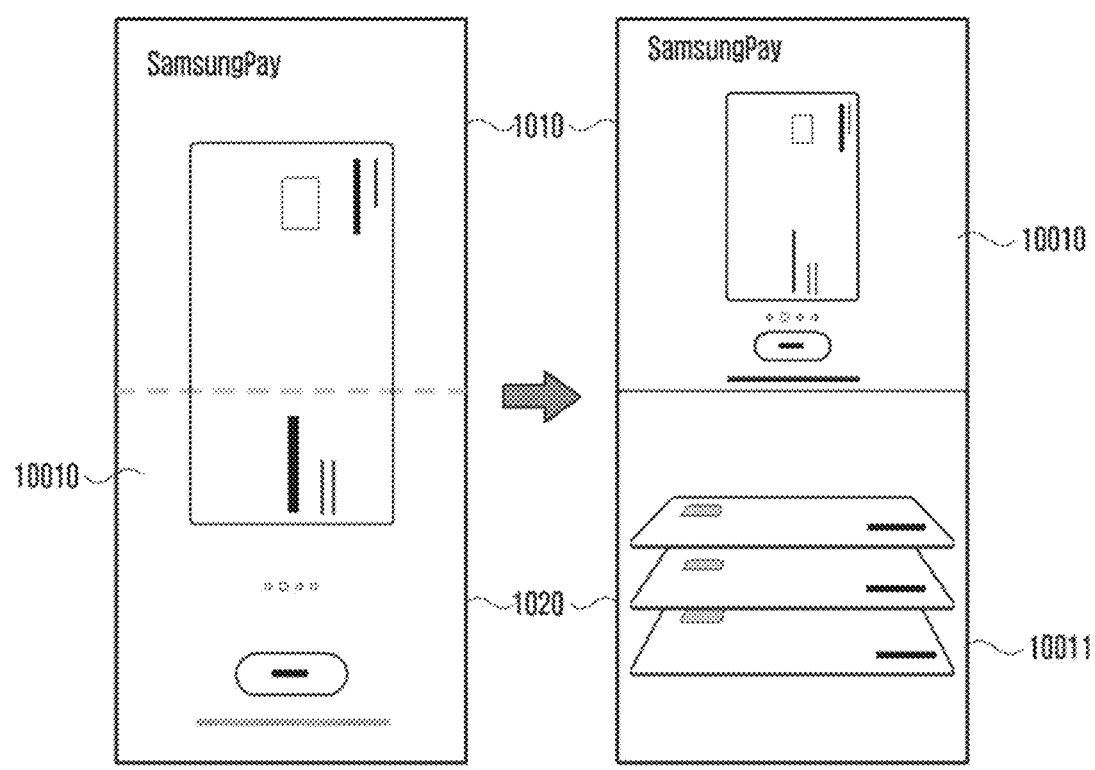

Referring to FIG. 10E, the electronic device 101 according to an embodiment may recognize a screen split gesture by a first touch input received in the first boundary area of the first touch screen display 1010 and a second touch input received in the second boundary area of the second touch screen display 1020 at substantially the same time in a state of displaying a card payment screen (e.g., a credit payment application) 10010 in a single window through the first touch screen display 1010 and the second touch screen display 1020. The electronic device 101 may display the card payment screen 10010 by default in the first split window corresponding to the first touch screen display 1010 and may display a card list screen 10011 registered in connection with a card payment app in the second split window corresponding to the second touch screen display 1020 in response to the screen split gesture.

Figure 10F:
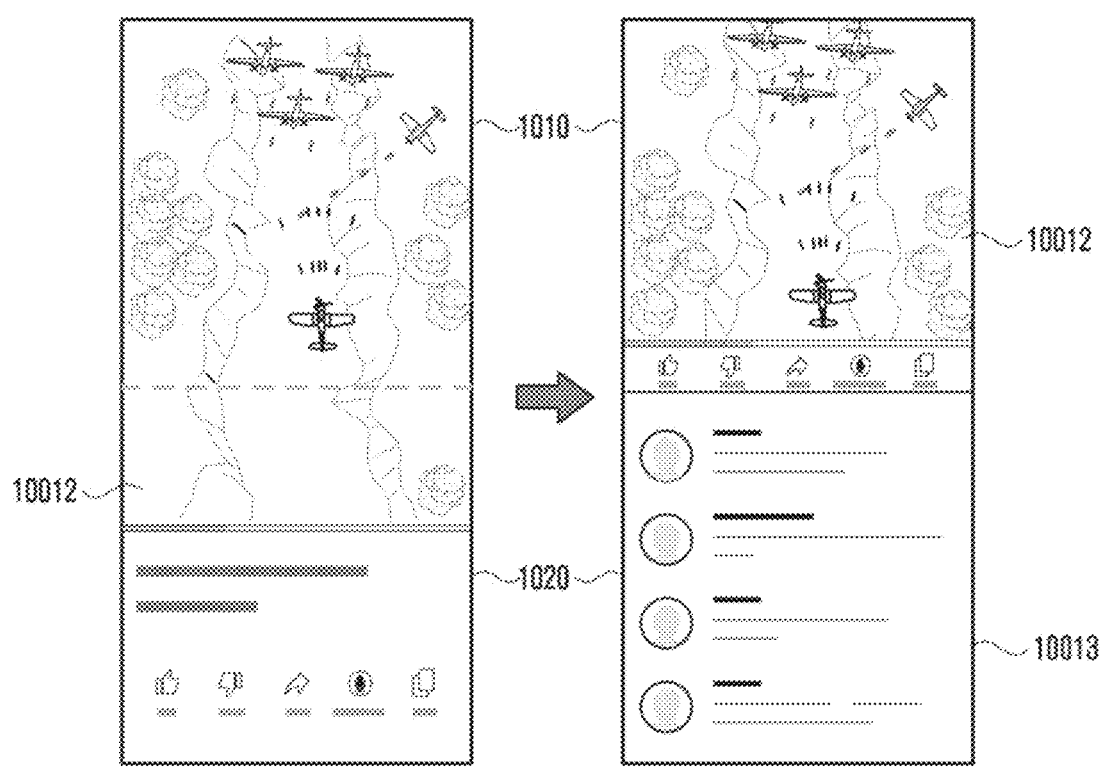

Referring to FIG. 10F, the electronic device 101 according to an embodiment may recognize a screen split gesture by a first touch input received in the first boundary area of the first touch screen display 1010 and a second touch input received in the second boundary area of the second touch screen display 1020 at substantially the same time in a state of displaying an integrated media application (e.g., a YouTube application) 10012 in a single window through the first touch screen display 1010 and the second touch screen display 1020. The electronic device 101 may display an integrated media application screen 10012 designated by default in the first split window corresponding to the first touch screen display 1010 and may display a different execution screen 10013 having a designated depth structure (e.g., a comment information screen of a video being played) in connection with the integrated media application in the second split window corresponding to the second touch screen display 1020 in response to the screen split gesture.

FIG. 11A to 11D illustrate a screen split situation of an electronic device including a plurality of touch screen displays according to various embodiments.

When an object (e.g., text or image metadata) designated or selected corresponding to a screen split function in connection with an app execution screen currently display is included, the electronic device (e.g., the electronic device 101 of FIG. 1) according to various embodiments may provide a screen related to the designated or selected object in a split window.

Figure 11A:
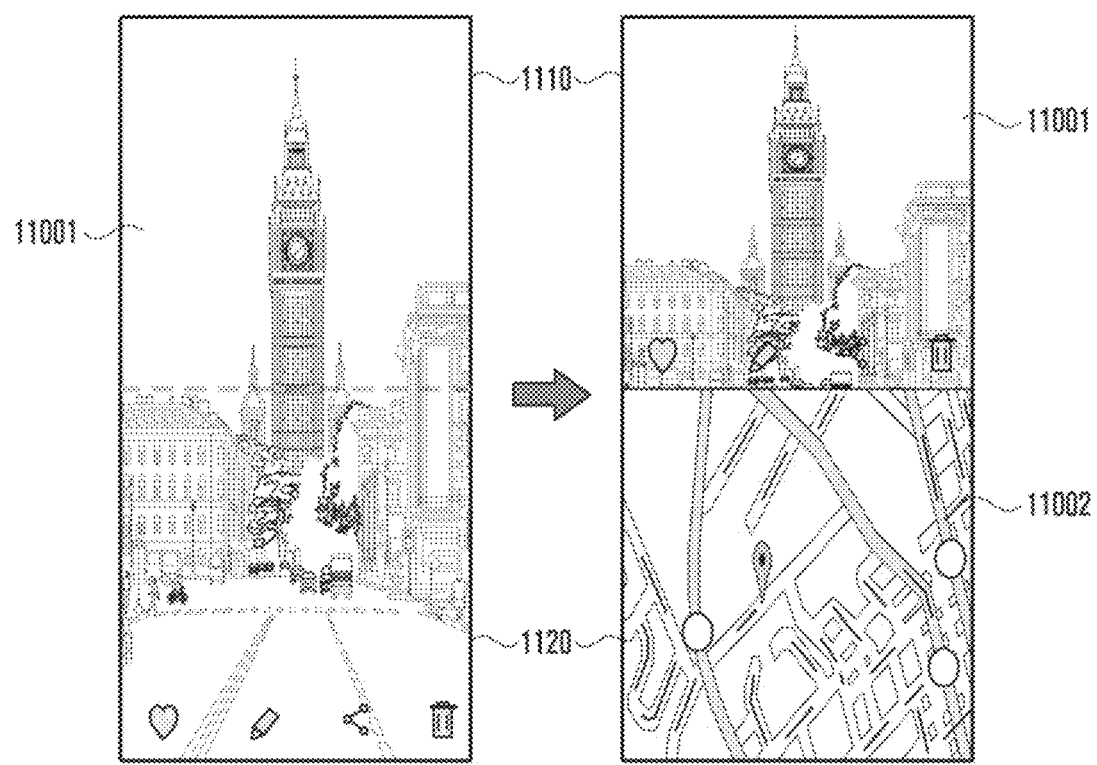
FIG. 11A to 11D illustrate a screen split situation of an electronic device including a plurality of touch screen displays according to various embodiments.

Referring to FIG. 11A, the electronic device 101 according to an embodiment may recognize a screen split gesture by a first touch input received in a first boundary area of a first touch screen display 1110 and a second touch input received in a second boundary area of a second touch screen display 1120 at substantially the same time in a state of displaying a first picture 11001 of a gallery app (e.g., a gallery application) in a single window through the first touch screen display 1110 and the second touch screen display 1120. The electronic device 101 may designate position information among, for example, metadata on the picture, as an object related to screen split.

The electronic device 101 may display the first picture 11001 in a first split window corresponding to the first touch screen display 1110 and may display a screen 11002 displaying attribute information about the first picture (e.g., position information about the first picture) in a second split window corresponding to the second touch screen display 1020 in response to the screen split gesture.

Figure 11B:
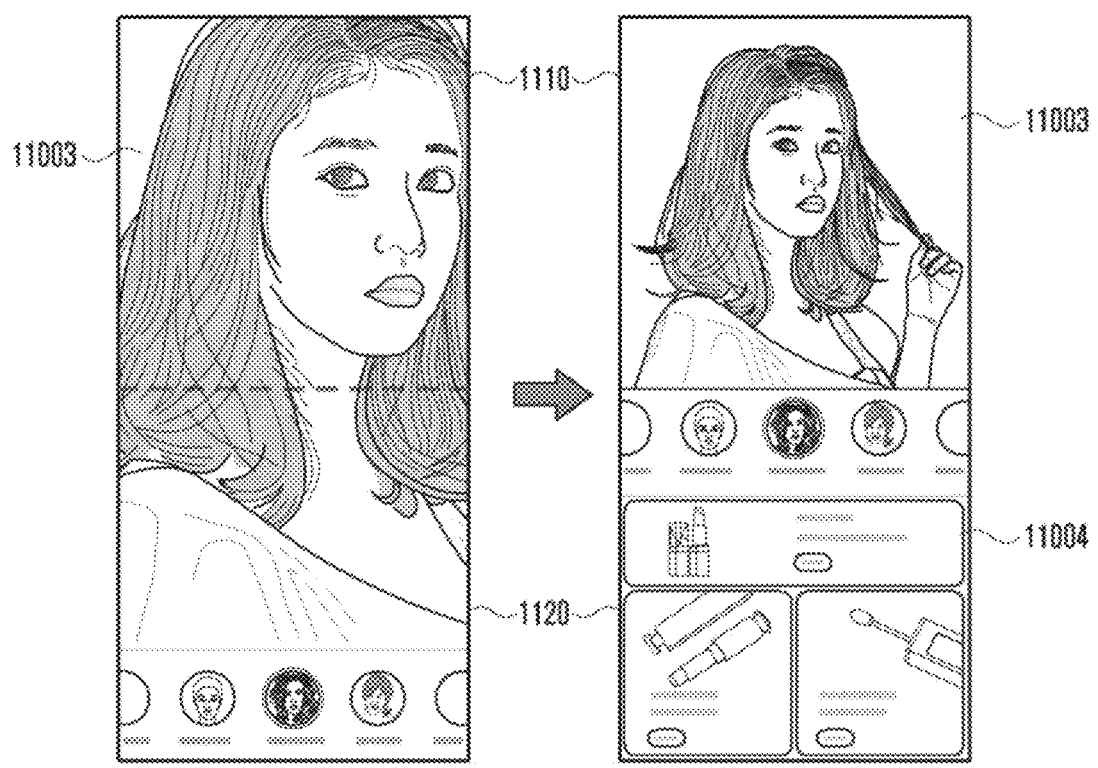

Referring to FIG. 11B, the electronic device 101 according to an embodiment may recognize a screen split gesture by a first touch input received in the first boundary area of the first touch screen display 1110 and a second touch input received in the second boundary area of the second touch screen display 1120 at substantially the same time in a state of displaying a camera image 11003 captured in a virtual reality camera mode in a single window through the first touch screen display 1110 and the second touch screen display 1120. The electronic device 101 may display the camera image 11003 currently displayed in the first split window corresponding to the first touch screen display 1110 and may display an augmented reality (AR) data screen 11004 (e.g., a purchase list screen of objects included in an AR-based camera image) retrieved based on the displayed camera image 11003 in the second split window corresponding to the second touch screen display 1020 in response to the screen split gesture.

When the screen split gesture is recognized in a state in which a filter is applied to the camera image, the electronic device 101 according to various embodiments may display a filter list designated as a screen split function in a split window, or may execute a second camera and may display an image of the second camera in a split window. The electronic device 101 may display execution screens related to an application being executed in the first split window and the second split window in various combinations according to a design or configuration.

Figure 11C:
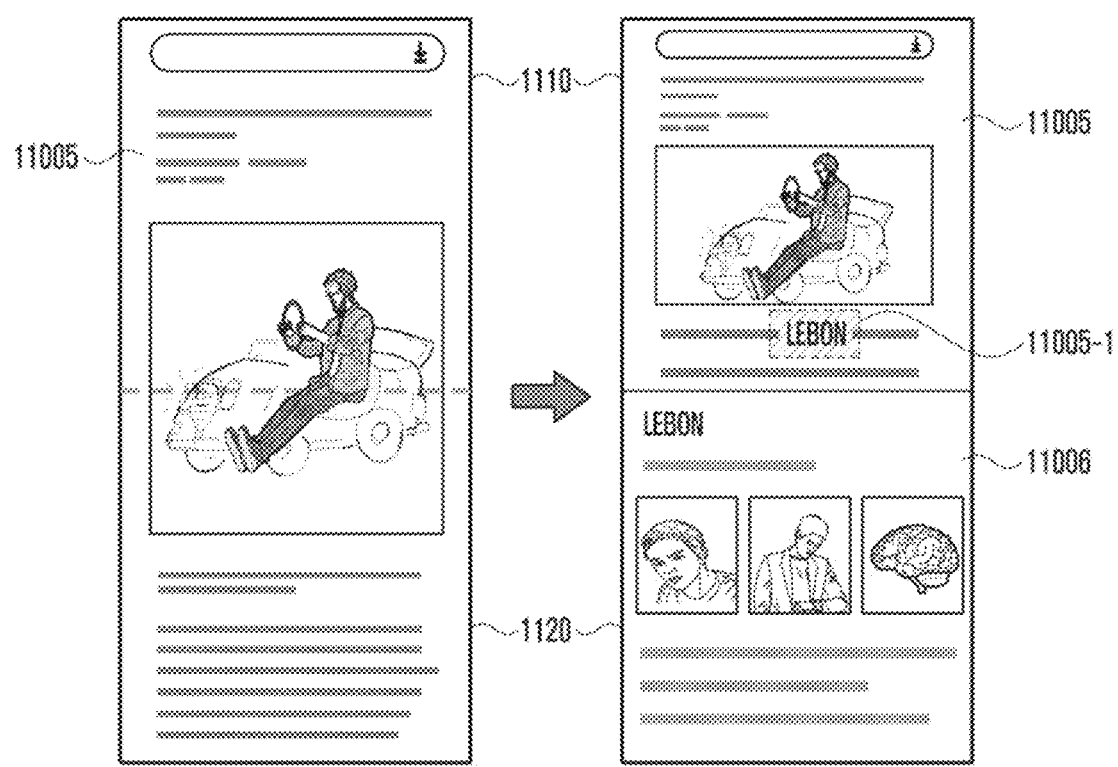

Referring to FIG. 11C, the electronic device 101 according to an embodiment may display a web browser screen 11005 in a single window through the first touch screen display 1110 and the second touch screen display 1120.

The electronic device 101 may receive a user input 11005-1 to select text (or context or an object) to be retrieved on the web browser screen.

The electronic device 101 may recognize a screen split gesture by a first touch input received in the first boundary area of the first touch screen display 1110 and a second touch input received in the second boundary area of the second touch screen display 1120 substantially at the same time in a state of displaying the web browser screen 11005 with the text selected.

The electronic device 101 may display the web browser screen 11005 currently displayed in the first split window corresponding to the first touch screen display 1110 and may display a screen 11006 retrieved based on the text selected by a user (e.g., a detailed information screen related to the text) as a second screen in the second split window corresponding to the second touch screen display 1020 in response to the screen split gesture.

Figure 11D:
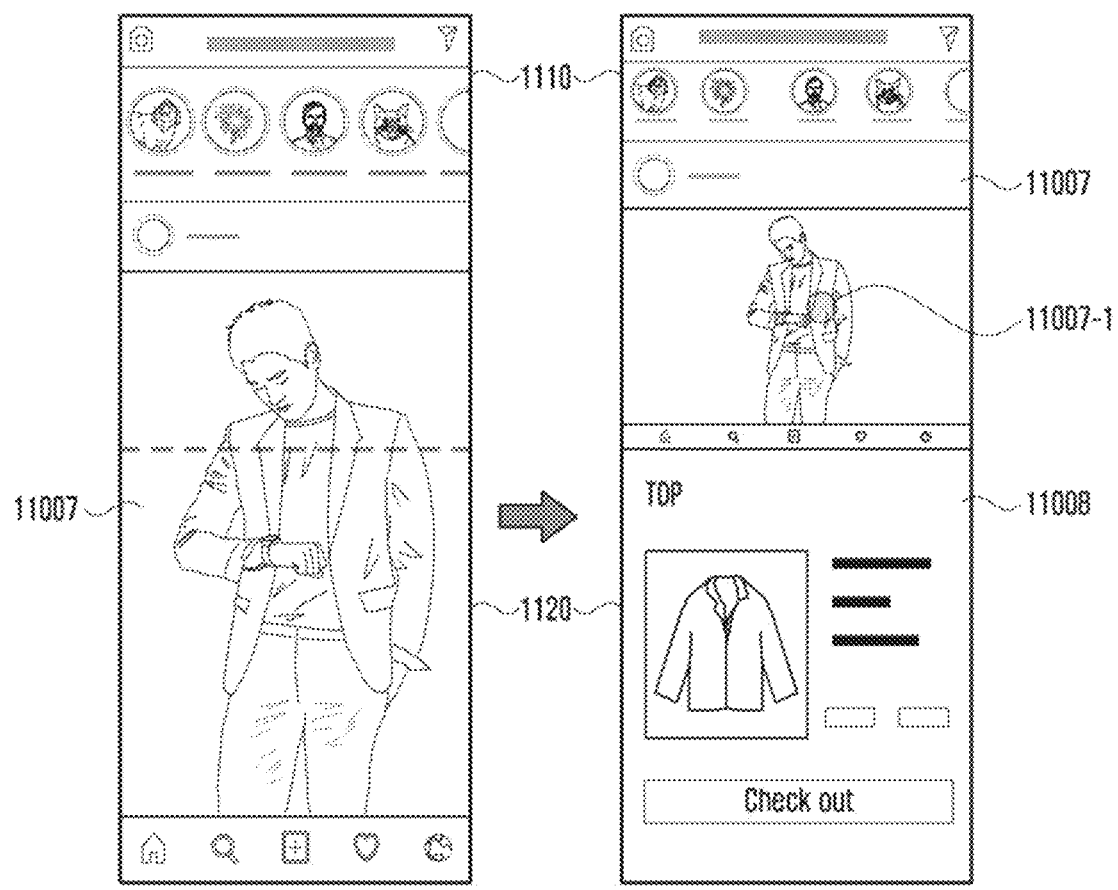

Referring to FIG. 11D, the electronic device 101 according to an embodiment may display a social commerce screen 11007 in a single window through the first touch screen display 1110 and the second touch screen display 1120.

The electronic device 101 may receive a user input 11007-1 to select a product object to be retrieved (e.g., a shirt object displayed on the screen) on the social commerce screen 11007.

The electronic device 101 may recognize a screen split gesture by a first touch input received in the first boundary area of the first touch screen display 1110 and a second touch input received in the second boundary area of the second touch screen display 1120 substantially at the same time in a state of displaying the social commerce screen 11007 with the product object selected.

The electronic device 101 may display the social commerce screen 11007 currently displayed in the first split window corresponding to the first touch screen display 1110 and may display a purchase screen 11008 retrieved based on the product object selected by the user (e.g., a path link information screen for purchasing the selected shirt) in the second split window corresponding to the second touch screen display 1020 in response to the screen split gesture.

Figure 12:
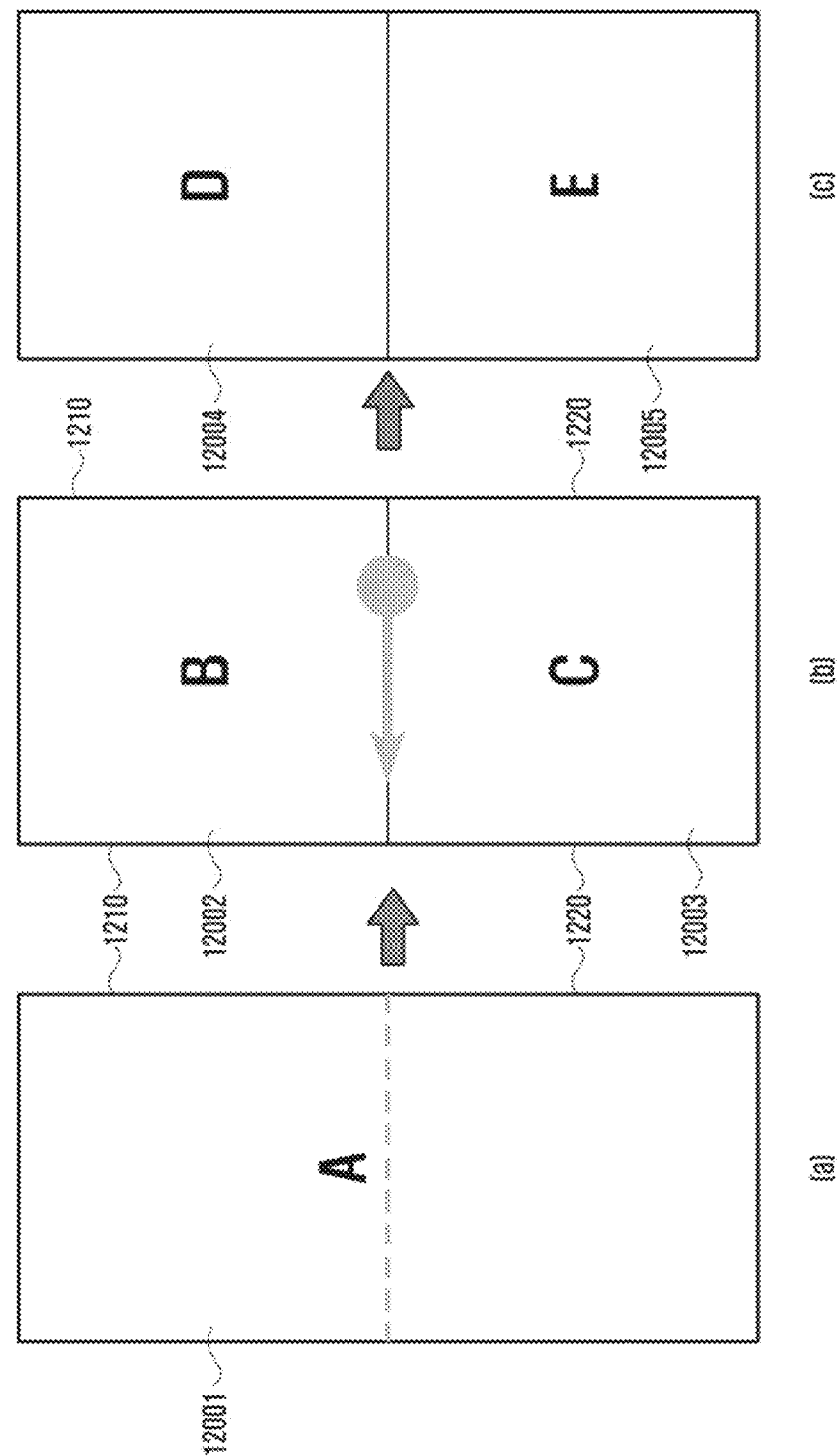
FIG. 12 illustrates a screen split situation of an electronic device including a plurality of touch screen displays according to various embodiments.

FIG. 12 illustrates a screen split situation of an electronic device including a plurality of touch screen displays according to various embodiments.

Referring to FIG. 12, when a first touch input and a second touch input are simultaneously received and moved within a first boundary area (e.g., the first boundary area 421 of FIG. 4) and a second boundary area (e.g., the second boundary area 431 of FIG. 4) but are moved in a third direction opposite to a first direction in a state in which a first app execution screen is executed, the electronic device (e.g., the electronic device 101 of FIG. 1) according to an embodiment may switch to display execution screens of tasks (or apps) being executed in the background.

The electronic device 100 may execute a plurality of apps A, B, C, D, E, and the like, may provide one of the executed apps on a foreground screen, and may execute the other apps in the background.

For example, as shown in FIG. 12, the electronic device 101 may identify that the first touch input received in the first boundary area of a first touch screen display 1210 and the second touch input received in the second boundary area of a second touch screen display at substantially the same time start from a second position and move in the third direction to a first position in a state of displaying the first app execution screen A 12001 in a single window through the first touch screen display 1210 and the second touch screen display 1220.

The electronic device 101 may display a second app execution screen B 12002 in a first split window corresponding to the first touch screen display 1210 and may display a third app execution screen C 12003 in a second split window corresponding to the second touch screen display 1220 in response to recognition of a screen split gesture of moving the first touch input and the second touch input in the third direction within the boundary areas.

Successively, when a screen split gesture of moving the first touch input and the second touch input again in the third direction within the first boundary area and the second boundary area is recognized in a state of displaying the second app execution screen B 12002 on the first touch screen display 1210 and displaying the third app execution screen C 12003 on the second touch screen display 1220, the electronic device 101 may display a fourth app execution screen D 12004 in the first split window corresponding to the first touch screen display 1210 and may display a fifth app execution screen E 12005 in the second split window corresponding to the second touch screen display 1220. The electronic device 101 may support tasks (or apps) being executed in the background to be switched according to execution order (e.g., reverse chronological order).

Figure 13:
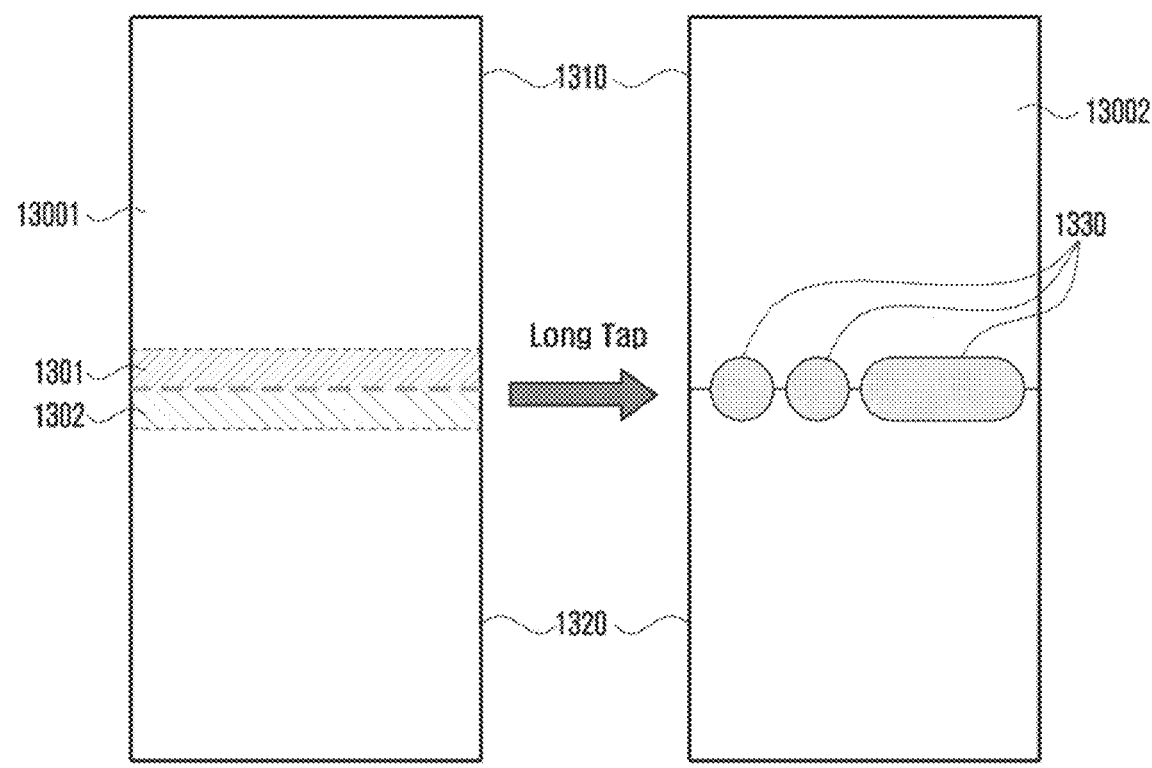
FIG. 13 illustrates a screen split situation of an electronic device including a plurality of touch screen displays according to various embodiments.

FIG. 13 illustrates a screen split situation of an electronic device including a plurality of touch screen displays according to various embodiments.

Referring to FIG. 13, according to an embodiment, the electronic device (e.g., the electronic device 101 of FIG. 1) may provide a menu GUI related to screen split gesture recognition, based on a first touch input and a second touch input received in a first boundary area and a second boundary area.

For example, the electronic device 101 may identify that the first touch input received in the first boundary area 1301 of a first touch screen display 1310 and the second touch input received in the second boundary area 1302 of a second touch screen display 1320 are long-tap (e.g., long-tap, long-press, or long-touch) gestures for a preset time. When the first touch input and the second touch input are long taps within the boundary areas 1301 and 1302, the electronic device 101 may provide a control user interface (UI) 1330 for a split screen (or operating the displays in a split manner).

The control UI 1330 may be displayed on the first boundary area 1301 and the second boundary area 1302, without being limited thereto, and may also be displayed through at least part of screens 13001 and 13002 of the first touch screen display 1310 or the second touch screen display 1320.

For example, the control UI 1330 may include a menu, such as a position change option for each screen, a sound volume control option, an option to change each aspect ratio, and a focus change option, but is not limited thereto.

Figure 14A:
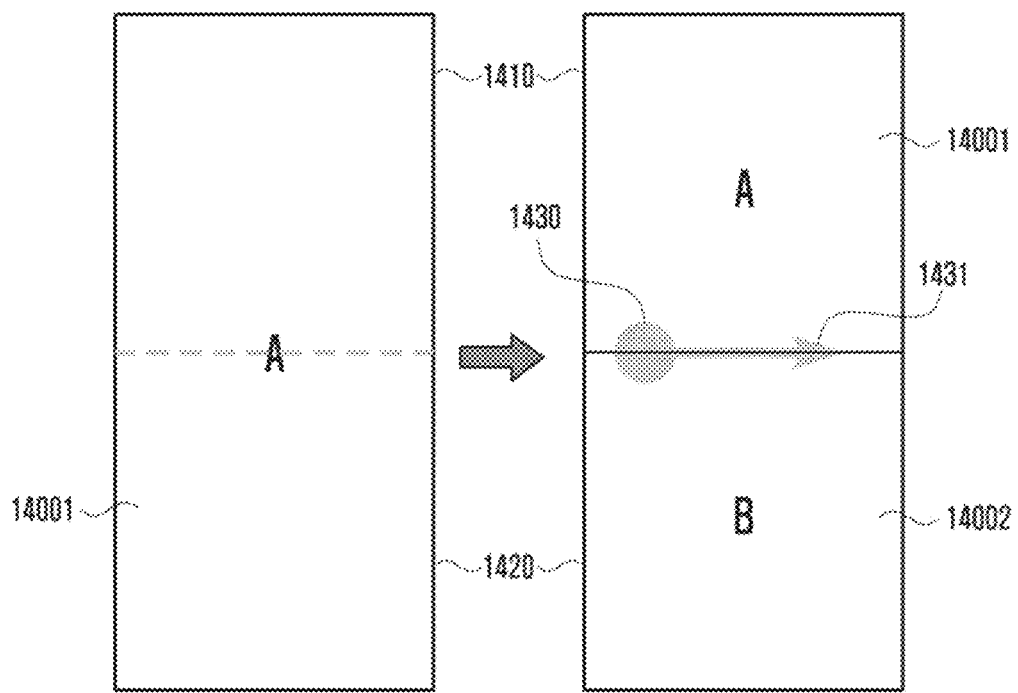
FIGS. 14A and 14B illustrate screen split situations of an electronic device including a plurality of touch screen displays according to various embodiments.
Figure 14B:
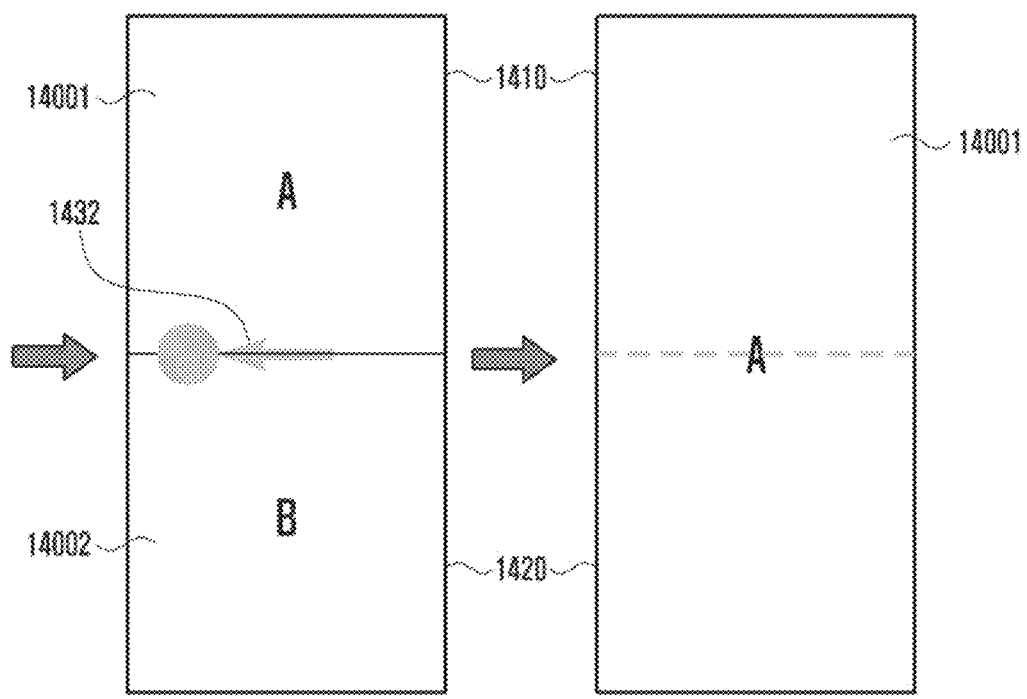

FIGS. 14A and 14B illustrate screen split situations of an electronic device including a plurality of touch screen displays according to various embodiments.

Referring to FIG. 14A, according to an embodiment, the electronic device (e.g., the electronic device 101 of FIG. 1) may operate a first touch screen display 1410 and a second touch screen display 1420 as a single window.

As shown in view FIG. 14A, the electronic device 101 may determine that a screen split gesture is recognized, based on a condition that a first touch input received within a first boundary area and a second touch input received within a second boundary area at substantially the same time are moving in a first direction (1431) in a state of displaying a first app execution screen 14001 in the single window through the first touch screen display 1410 and the second touch screen display 1420.

The electronic device 101 may display graphic information introducing screen split when the first touch input and the second touch input satisfy a screen split gesture recognition condition. For example, the electronic device 101 may display a screen split gesture recognition area (e.g., the boundary areas) to be visually distinguished, may display a split screen gesture recognition graphic user interface (GUI), or may display a touch indicator which responds to a touch gesture.

In some cases, the electronic device 101 may display the first execution screen 14001 in a first split window corresponding to the first touch screen display 1410 and may display a second execution screen 14002 corresponding to the second touch screen display 1420 upon determining that the screen split gesture is recognized.

As shown in FIG. 14B, the electronic device 101 may receive a signal indicating that the first touch input and the second touch input are changed back in a second direction.

For example, when a user may recognize that the electronic device 101 enters a screen split mode through the graphic information introducing the screen split provided when the first touch input and the second touch input satisfy the screen split gesture recognition condition, and may change the first touch input and the second touch input, which are moving in the first direction, to the second direction to cancel the screen split mode.

The electronic device 101 may switch to display the first app execution screen 14001 in the single window through the first touch screen display 1410 and the second touch screen display 1420 in response to the first touch input and the second touch input moving back in the second direction from the first direction.

Figure 15:
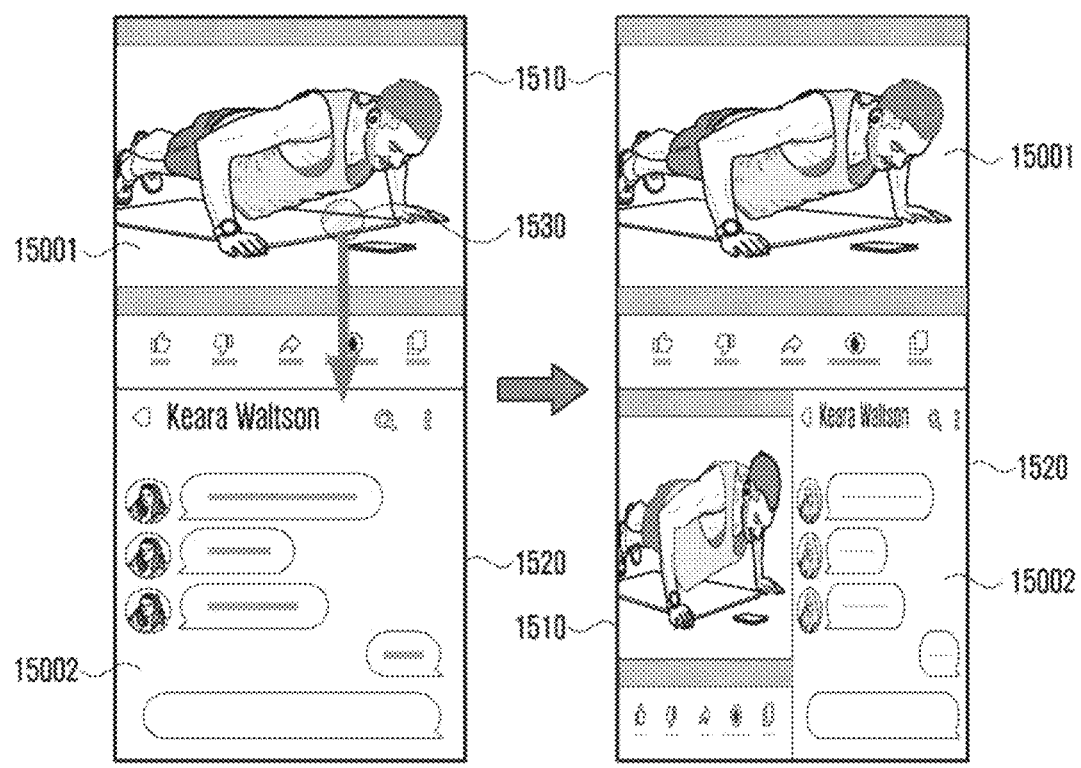
FIG. 15 illustrates a screen split situation of an electronic device including a plurality of touch screen displays according to various embodiments.

FIG. 15 illustrates a screen split situation of an electronic device including a plurality of touch screen displays according to various embodiments.

Referring to FIG. 15, the electronic device (e.g., the electronic device 101 of FIG. 1) according to an embodiment may display a first execution screen 15001 in a first split window corresponding to a first touch screen display 1510 and may display a second execution screen 15002 in a second split window corresponding to a second touch screen display 1520.

The electronic device 101 may select an object (e.g., an image object) included in the first screen 15001, and may receive a touch input 1530 to move the selected object in a direction of the second split window corresponding to the second touch screen display 1520.

The electronic device 101 may execute a function related to an application being executed on the second screen 15002, based on the object selected on the first screen 15001. For example, when a message application is being executed on the second screen 15002, the electronic device 101 may transmit an image object selected by a user to an external electronic device through the message application.

Figure 16A:
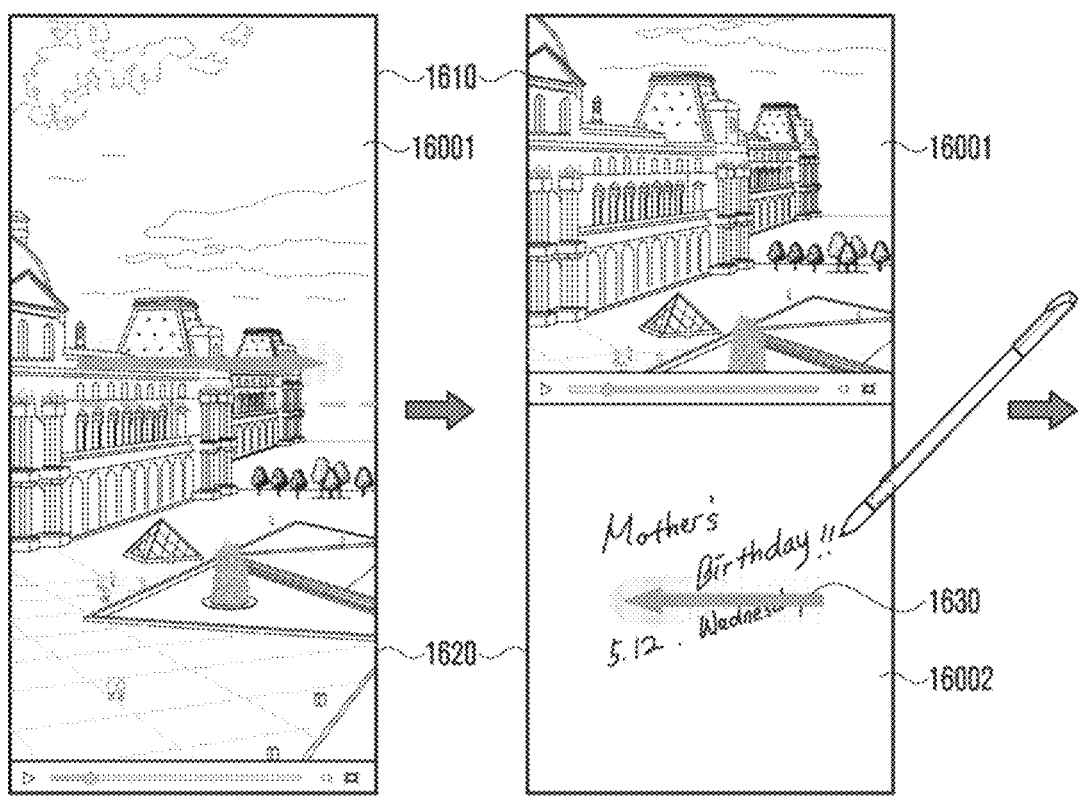
FIGS. 16A and 16B illustrate screen split situations of an electronic device including a plurality of touch screen displays according to various embodiments.
Figure 16B:
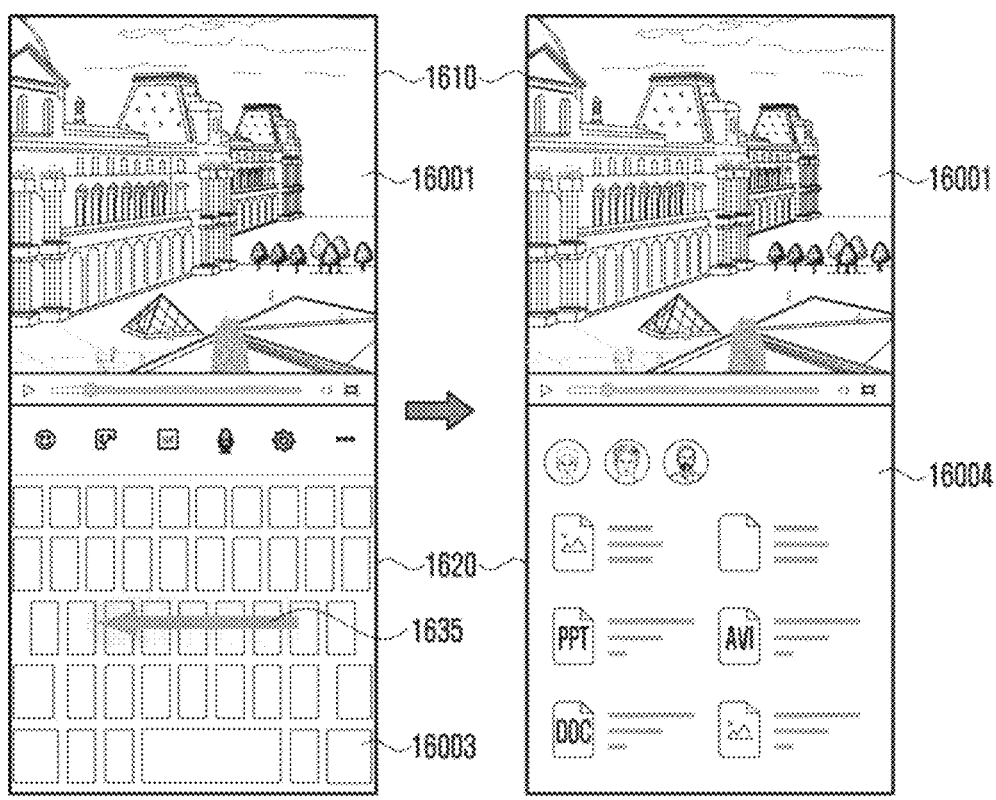

FIGS. 16A and 16B illustrate screen split situations of an electronic device including a plurality of touch screen displays according to various embodiments.

Referring to FIG. 16A, the electronic device (e.g., the electronic device 101 of FIG. 1) according to an embodiment may display a first execution screen 16001 (e.g., a video lecture app screen) in a first split window corresponding to a first touch screen display 1610 and may display a second execution screen 16002 (e.g., a memo screen) in a second split window corresponding to a second touch screen display 1620.

The electronic device 101 may receive a touch drag 1630 of moving in one direction on the second execution screen 16002.

The electronic device 101 may switch the second execution screen 16002 displayed in the second split window corresponding to the second touch screen display 1620 to a different execution screen (e.g., a keyboard screen) having a different depth structure related to an application of the first execution screen and may display the different execution screen as a third execution screen 16003 in response to the touch drag 130.

As shown in FIG. 16B, the electronic device 101 may additionally receive a touch drag 1635 of moving in one direction on the third execution screen 16003 through the second touch screen display 1620.

The electronic device 101 may switch to display a different execution screen (e.g., a reference list screen related to a video lecture) having another different depth structure related to the application of the first screen in the second split window as a fourth execution screen 16004 in response to the touch drag 1630.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a hinge device;
a first housing connected to the hinge device;
a second housing connected to the hinge device and configured to be folded with respect to the first housing via the hinge device;
a first touch screen display provided on a first side of the first housing;
a second touch screen display provided on a second side of the second housing, the first touch screen display and the second touch screen display facing each other in a folded state; and
at least one processor operatively connected to the first touch screen display and the second touch screen display,
wherein the at least one processor is configured to:
display a first execution screen displaying visual information in a single window having a first size on the first touch screen display and the second touch screen display;
based on a first touch input on the first touch screen display and a second touch input on the second touch screen display being received at substantially a same time while the first execution screen is displayed in the single window having the first size, determine whether the first touch input and the second touch input are recognized as a screen split gesture based on the first touch input starting within a first boundary area of the first touch screen display and being released after moving by a preset distance and the second touch input starting within a second boundary area of the second touch screen display and being released after moving by the preset distance at substantially the same time; and
based on recognition of the screen split gesture, displaying the first execution screen in one of a first split window having a second size corresponding to the first touch screen display and a second split window corresponding to the second touch screen display by splitting the single window and display a second execution screen in the other one of the first split window and the second split window, and
wherein the first boundary area and the second boundary area are adjacent to each other in an area at which the first housing and the second housing are connected to each other through the hinge device, and
wherein the at least one processor is further configured to, based on the first touch input and the second touch input moving by a configured distance in a first direction within the first boundary area and the second boundary area and then at least one of the first touch input and the second touch input moving in a second direction perpendicular to the first direction, display the first execution screen in a split window in the second direction, among the first split window and the second split window, and display the second execution screen in a split window in a direction opposite to the second direction, among the first split window and the second split window.

2. The electronic device of claim 1, wherein the at least one processor is further configured to, based on the first touch input not being detected within the first boundary area and the second touch input not being detected within the second boundary area, recognize a touch gesture according to at least one of the first touch input and the second touch input, and execute a touch function corresponding to the recognized touch gesture.

3. The electronic device of claim 1, wherein a touch start point and a touch end point are designated in part of the first boundary area and the second boundary area, and
wherein the at least one processor is further configured to recognize the first touch input and the second touch input as the screen split gesture based on the first touch input and the second touch input starting at the touch start point and being released at the touch end point after moving in the first direction within the first boundary area and the second boundary area, respectively.

4. The electronic device of claim 1, wherein the at least one processor is further configured to, based on the recognition of the screen split gesture and the first execution screen displayed in the single window being a home screen, display the first execution screen in the first split window to be the home screen adjusted to the second size, and display the second execution screen in the second split window to be a new home screen adjusted to a size of the second touch screen display.

5. The electronic device of claim 1, wherein the at least one processor is further configured to, based on the recognition of the screen split gesture and the first execution screen displayed in the single window being an execution screen of a first application having the first size, display the first execution screen in the first split window to be the execution screen of the first application adjusted to the second size, and display the second execution screen in the second split window to be at least one of a home screen adjusted to a size of the second touch screen display or a different execution screen related to the first application.

6. The electronic device of claim 1, wherein the at least one processor is further configured to, based on the first touch input and the second touch input moving in a third direction opposite to the first direction within the first boundary area and the second boundary area, display a third execution screen different from the first execution screen in the first split window and display a fourth execution screen different from the first execution screen in the second split window, and
wherein the third execution screen and the fourth execution screen comprise execution screens of applications being executed in a background.

7. The electronic device of claim 1, wherein the at least one processor is further configured to, based on the first execution screen being an execution screen of a first application and there being a designated function related to screen split corresponding to the first application, display an execution screen related to the designated function as the second execution screen.

8. The electronic device of claim 1, wherein the at least one processor is further configured to, based on the first execution screen being an execution screen of a first application and the screen split gesture being recognized in a state in which one of objects displayed on the execution screen of the first application is selected by a user input, retrieve information related to the selected object and display a screen of the retrieved information as the second execution screen.

9. The electronic device of claim 1, wherein the at least one processor is further configured to display a graphic object introducing recognition of the screen split gesture in at least one of the first boundary area and the second boundary area based on recognition of the first touch input and the second touch input as the screen split gesture.

10. The electronic device of claim 1, wherein the at least one processor is further configured to, based on the first touch input received within the first boundary area and the second touch input received within the second boundary area being long touches made substantially at the same time for over a preset time, display a control user interface for a screen split function in the first boundary area and the second boundary area.

11. The electronic device of claim 1, wherein the at least one processor is further configured to, based on a touch gesture of selecting an object included in an execution screen of a first application and moving the object in a direction to an execution screen of a second application being received in a state of displaying the execution screen of the first application as the first execution screen in the first split window and displaying the execution screen of the second application as the second execution screen in the second split window, execute a function of the second application being executed on the second execution screen, based on the object selected on the execution screen of the first application.

12. The electronic device of claim 1, wherein the at least one processor is further configured to, based on a touch drag of moving in one direction in the second split window being received in a state of displaying an execution screen of a first application as the first execution screen in the first split window and displaying a different execution screen related to the first application as the second execution screen in the second split window, switch to a different execution screen related to the first application in the second split window.

13. A method of an electronic device comprising a plurality of touch screen displays, the method comprising:
displaying a first execution screen displaying visual information in a single window having a first size on a first touch screen display disposed in a first housing and a second touch screen display disposed in a second housing;
based on a first touch input on the first touch screen display and a second touch input on the second touch screen display being received at substantially a same time while the first execution screen is displayed in the single window having the first size, determining whether the first touch input and the second touch input are recognized as a screen split gesture based on the first touch input starting within a first boundary area of the first touch screen display and being released after moving by a preset distance and the second touch input starting within a second boundary area of the second touch screen display and being released after moving by the preset distance substantially at the same time; and
based on recognition of the screen split gesture, displaying the first execution screen in one of a first split window having a second size corresponding to the first touch screen display and a second split window corresponding to the second touch screen display by splitting the single window and displaying a second execution screen in the other one of the first split window and the second split window, wherein the first boundary area and the second boundary area are adjacent to each other at one side on which the first housing and the second housing are connected to each other through a hinge device, and wherein the displaying the first execution screen in one of the first split window and the second split window and displaying the second execution screen in the second split window in the other one of the first split window and the second split window further comprises, based on the first touch input and the second touch input moving in a configured distance in a first direction within the first boundary area and the second boundary area and then at least one of the first touch input and the second touch input moving in a second direction perpendicular to the first direction, displaying the first execution screen in a split window in the second direction, among the first split window and the second split window, and displaying the second execution screen in a split window in a direction opposite the second direction, among the first split window and the second split window.

14. The method of claim 13, further comprising, based on the first touch input and the second touch input not being detected within the first boundary area and the second boundary area, recognizing a touch gesture according to at least one of the first touch input and the second touch input, and executing a touch function corresponding to the recognized touch gesture.

* * * * *